(12) United States Patent
Rydström

(10) Patent No.: US 12,439,024 B2
(45) Date of Patent: Oct. 7, 2025

(54) PROVISION OF REAL WORLD AND IMAGE SENSOR CORRESPONDENCE POINTS FOR USE IN CALIBRATION OF AN IMAGING SYSTEM FOR THREE DIMENSIONAL IMAGING BASED ON LIGHT TRIANGULATION

(71) Applicant: SICK IVP AB, Linköping (SE)

(72) Inventor: Daniel Rydström, Linköping (SE)

(73) Assignee: SICK IVP AB, Linköping (SE)

( * ) Notice: Subject to any disclaimer, the term of this patent is extended or adjusted under 35 U.S.C. 154(b) by 179 days.

(21) Appl. No.: 18/490,837

(22) Filed: Oct. 20, 2023

(65) Prior Publication Data
US 2024/0187565 A1    Jun. 6, 2024

(30) Foreign Application Priority Data
Dec. 2, 2022 (EP) ..................................... 22211198

(51) Int. Cl.
*G06T 7/80* (2017.01)
*H04N 17/04* (2006.01)

(52) U.S. Cl.
CPC .............. *H04N 17/04* (2013.01); *G06T 7/80* (2017.01)

(58) Field of Classification Search
CPC ... G06T 7/80; G06T 7/521; G01S 7/48; G01S 7/497
See application file for complete search history.

(56) References Cited

U.S. PATENT DOCUMENTS

| 8,427,656 B2 | 4/2013 | Hullin |
| 9,734,419 B1 * | 8/2017 | Ye ............................. G06T 7/85 |
| 10,930,013 B2 | 2/2021 | Boyle |

FOREIGN PATENT DOCUMENTS

| JP | 2005098973 | 4/2005 |
| JP | 2016048206 | 4/2016 |

OTHER PUBLICATIONS

Rydström, D., "Calibration of Laser Triangulating Cameras in Small Fields of View." (Dissertation),2013; retrieved from https://urn.kb.se/resolve?urn=urn:nbn:se:liu:diva-94210.

(Continued)

*Primary Examiner* — Thanh Luu
(74) *Attorney, Agent, or Firm* — DUANE MORRIS LLP; Gregory M. Lefkowitz

(57) ABSTRACT

Method and device(s) for provision of a pair of real world and image sensor correspondence points for use in calibration of an imaging system (405) for three dimensional imaging based on light triangulation. Said real world point (514-1; 529-1) being provided (801) as a first virtual intersection between a first real world line (512a; 527a) and a second real world line (512b; 527b). Said image sensor point (544-1; 554-1) being provided (802) as a second virtual intersection between a first image line (542a; 552a) and a second image line (542b; 552b). A first image (540a; 550a) by the imaging system comprises captured light that images the first real world line (512a; 527a) and a second image (540b; 550b) by the imaging system comprises captured light that images the second real world line (512b; 527b). The first image line (542a; 552a) corresponds to positions of intensity peaks of said captured light in the first image (540a; 550a) and the second image line (542b; 552b) corresponds to positions of intensity peaks of said captured light in the second image (540b; 550b).

11 Claims, 11 Drawing Sheets

(56) References Cited

OTHER PUBLICATIONS

Xu, G., et al., "An optimization solution of a laser plane in vision measurement with the distance object between global origin and calibration points," Scientific Reports, Jul. 7, 2015, vol. 5, No. 1.

* cited by examiner

PROVISION OF REAL WORLD AND IMAGE SENSOR CORRESPONDENCE POINTS FOR USE IN CALIBRATION OF AN IMAGING SYSTEM FOR THREE DIMENSIONAL IMAGING BASED ON LIGHT TRIANGULATION

TECHNICAL FIELD

Embodiments herein concern provision of real world and image sensor correspondence points for use in calibration of an imaging system for three dimensional (3D) imaging based on light triangulation.

BACKGROUND

Industrial vision cameras and systems for factory and logistic automation may be based on three-dimensional (3D) machine vision, where 3D-images of a scene and/or object are captured. By 3D-images it is referred to images that comprise also "height", or "depth", information and not, or at least not only, information, e.g. intensity and/or color, regarding pixels in only two-dimensions (2D) as in a conventional image. That is, each pixel of the image may comprise information associated with the position of the pixel and that maps to a position of what has been imaged, e.g. the object. Processing may then be applied to extract information on characteristics of the object from the 3D images, i.e. 3D-characteristics of the object, and e.g. convert to various 3D image formats. Such information on height may be referred to as range data, where range data thus may correspond to data from height measurement of the object being imaged, or in other words from range or distance measurements of the object. Alternatively or additionally the pixel may comprise information on e.g. material properties such as relating to the scattering of the light in the imaged area or the reflection of a specific wavelength of light.

Hence, a pixel value may e.g. relate to intensity of the pixel and/or to range data and/or to material properties.

Line scan image data results when image data of an image is scanned or provided one line at a time, e.g. by camera with a sensor configured to sense and provide image data, one line of pixels at a time. A special case of line scan image is image data provided by so called "sheet of light", e.g. laser-line, 3D triangulation. Laser is often preferred but also other light sources able to provide a "sheet of light", that is, a light plane, can be used, e.g. light sources able to provide light that stays focused and do not spread out too much, or in other words, light that is "structured", for example light provided by a laser or Light Emitting Diode (LED).

3D machine vision systems are often based on light triangulation. In such a system there is a light source illuminating the object with a specific light pattern, such as the sheet of light as the specific light pattern, e.g. resulting in a light, or laser, line on the object and along which line 3D characteristics of the object can be captured, corresponding to a profile of the object. By scanning the object with such a line, i.e. performing a line scan, involving movement of the line and/or object, 3D characteristics of the whole object can be captured, corresponding to multiple profiles.

3D machine vision systems or devices that use a sheet of light for triangulation may be referred to as systems or devices for 3D imaging based on light, or light plane, triangulation, or simply laser triangulation when laser light is used.

Typically, to produce a 3D-image based on light triangulation, reflected light from an object to be imaged is captured by an image sensor of a camera and intensity peaks are detected in the image data. The peaks occur at positions corresponding to locations on the imaged object with the incident light, e.g. corresponding to a laser line, that was reflected from the object. The position in the image of a detected peak will map to a position on the object from where the light resulting in the peak was reflected.

A laser triangulating camera system, i.e. an imaging system based on light triangulation where the light is laser light, projects a laser line onto an object to create height profiles from the surface of the target object. By moving the object relative to the cameras and light sources involved, information on height profiles from different parts of the object can be captured by images and then combined and used with knowledge of relevant geometries of the system to produce a three dimensional representation of the object, i.e. 3D image data is provided. This technique may be described as grabbing of images of the light, typically a laser line, when it is projected onto and reflected by the object and then from the images extract positions of the reflected laser line. This is normally accomplished by identifying positions of intensity peaks in the image frames, for example by using a conventional peak finding algorithm. Typically, but not necessary, the imaging system is setup so that intensity peaks relating to reflected light should occur and be expected per column of the sensor and the position within the column maps to a height or depth.

Conventionally, image sensor calibration is performed that corrects for measurements errors within the light plane and include e.g. lens distortions and perspective effects. When these errors have been corrected, e.g. skewing distortions introduced by the placement of the light source(s) may be corrected as well. The coordinate systems are typically also aligned to some reference during calibration.

The calibration of an imaging system based on light triangulation for example involves finding relations to be able to transform image sensor data in image sensor coordinates to real world coordinates. In other words, the calibration is about providing a relation between image sensor coordinates and real world coordinates.

Relations from calibration typically need to be established each time the camera(s) and light source(s) are setup or changed, e.g. changes in position relative each other, changes in field of view, etc. In other words, calibration is done after or in connection with setup of the imaging system and before it is used in normal operation.

During the calibration, a calibration object with predetermined and known properties, such as geometry and dimensions, is imaged and utilized to establish said relations. The established relations are then used, e.g. to configure the imaging system, so that when an object is imaged by the imaging system during normal operation, a better and more correct 3D representation of the object is enabled and can be provided, such as in accordance with the object's actual and real dimensions. In other words, after calibration, during imaging and measurements on measure objects, it is from image sensor coordinates in an image imaging a measure object possible to get corresponding world coordinates for the measure object.

Calibration can be used to provide, e.g. calculate, a model or lookup table that can convert distorted raw measurements from a 3D imaging system based on light triangulation, in image sensor coordinates, into corrected real world coordinates. Another way to put it is that the calibration is about finding a mapping between image sensor coordinates and real world coordinates, i.e. to find a transformation from an image sensor coordinate space into a real world coordinate space. In general, such transformation is not linear due to lens distortion artifacts and because of the light field, typically laser field or plane, and the camera field of view within that field correspond to a slightly distorted polygon.

Accurately calibrated 3D imaging systems based on light triangulation, such as laser triangulation, require reference measurements that the calibration is based on. Independent of exact calibration method, the quality of the calibration cannot be more precise than the accuracy with which one can obtain the reference measurements and these depend on the calibration object and how the reference measurements are performed. The conventional approach is to image a calibration object with predetermined and known properties, e.g. geometries, and dimensions, and then in the image identify certain reference points resulting from imaging of certain reference features of the calibration object with known real world coordinates. Examples of such reference features are dots on the reference object, intersections of surfaces of the calibration object, apexes of the calibration object, etc. The reference feature may be directly identifiable in the image and/or possible to compute from extrapolation and/or intersection of lines in the image, e.g. to find apexes. With identification of the reference features in the image and thus in image sensor coordinates, it is thereafter possible to provide a mapping between the references features in the image sensor coordinates and the reference features in real world coordinates, which, as mentioned above, basically is what the calibration is about.

A prior art calibration object example is a saw tooth shaped target. Intersections between surfaces of the saw tooths, i.e. valleys and apexes, are identifiable as line intersections in the image. Said valleys and apexes can thus be used as reference features, and it is realized that mapping between image sensor coordinates and real world coordinates can be determined from this. Another type of prior art calibration object has a wedge shape to provide height variation, with dots as reference features on the wedge surface.

D. Rydström, 'Calibration of Laser Triangulating Cameras in Small Fields of View', Dissertation, 2013, ISRN: LITH-ISY-EX-13/4669-SE, DIVA, id: diva2:630377 is a dissertation work about a method regarding calibration for laser triangulation and also discloses information about other prior art, for example said saw tooth calibration object.

To sum up, prior art calibration for light triangulation systems relies on an accurately manufactured calibration target and require imaging of reference features of the calibration object and accurate measurements to identify references point in image sensor coordinates that correspond to the reference features, such as intersection of surfaces, apexes, dots etc.

SUMMARY

In view of the above, an object of the invention is to provide one or more improvements or alternatives to the prior art, such as to provide one or more improvements or alternatives regarding calibration of 3D imaging system based on light triangulation.

According to a first aspect of embodiments herein, the object is achieved by a method, performed by one or more devices, for provision of a pair of real world and image sensor correspondence points for use in calibration of an imaging system for three dimensional imaging based on light triangulation. Said imaging system comprising a camera with image sensor and a light source for providing a light plane. Said light triangulation involving imaging by said camera of reflected light resulting from said light plane intersecting with and thereby causing reflections from a surface. Said correspondence points being a real world point, located in said light plane, and an image sensor point that corresponds to where said real world point is imaged on the image sensor by the imaging system.

Said real world point is provided as a first virtual intersection between a first real world line and a second real world line. Said first real world line corresponds to a first real intersection between a first real surface and the light plane and wherein reflected light from said first real intersection is captured by the imaging system in a first image. Said second real world line corresponds to a second real intersection between a second real surface and the light plane and wherein reflected light from said second real intersection is captured by the imaging system in another, second, image.

Said image sensor point is provided as a second virtual intersection between a first image line corresponding to positions of intensity peaks of said captured light in the first image and a second image line corresponding to positions of intensity peaks of said captured light in the second image.

According to a second aspect of embodiments herein, the object is achieved by one or more devices, i.e. device(s), for provision of a pair of real world and image sensor correspondence points for use in calibration of an imaging system for three dimensional imaging based on light triangulation. Said imaging system comprising a camera with image sensor and a light source for providing a light plane. Said light triangulation involving imaging by said camera of reflected light resulting from said light plane intersecting with and thereby causing reflections from a surface. Said correspondence points being a real world point, located in said light plane, and an image sensor point that corresponds to where said real world point is imaged on the image sensor by the imaging system.

Said devices(s) being configured to provide said real world point as a first virtual intersection between a first real world line and a second real world line. Said first real world line corresponding to a first real intersection between a first real surface and the light plane and wherein reflected light from said first real intersection is captured by the imaging system in a first image. Said second real world line corresponding to a second real intersection between a second real surface and the light plane and wherein reflected light from said second real intersection is captured by the imaging system in another, second, image.

Said devices(s) being further configured to provide said image sensor point as a second virtual intersection between a first image line corresponding to positions of intensity peaks of said captured light in the first image and a second image line corresponding to positions of intensity peaks of said captured light in the second image.

According to a third aspect of embodiments herein, the object is achieved by one or more computer programs comprising instructions that when executed by one or more processors causes one or more devices to perform the method according to the first aspect.

According to a fourth aspect of embodiments herein, the object is achieved by a carrier comprising the computer program according to the third aspect.

The second virtual intersection, that corresponds to the image sensor point, is thus between image sensor lines in separate images, i.e. from different exposures of the image sensor. This may be compared with the prior art regarding calibration of imaging system for 3D imaging of objects based on light triangulation where physical calibration points, e.g. from physical intersections and points, are captured by a single image.

An advantage of using surfaces and virtual intersections, as in embodiments herein, is that negative effects associated with reference features, such as physical intersections and points on calibration objects, that prior art calibration relies on, can be avoided. For example, reference features in the prior art, such as mentioned in the Background, are often associated with various unwanted reconstruction artifacts or other biases resulting from the image acquisition procedure. For example, there may be problems with reflections in valleys that disturb measurements. Also, due to manufacturing limitations, reference features, such as physical peaks, may not be possible to be provided as sharp as desirable but e.g. rounded. Apart from extraction issues there is also often lens distortion present, which makes it tricky to accurately extrapolate peaks and valleys. In the case of dots as reference features, the use of intensity information may lead to triangulation artifacts at the dots, whereby depth content can become particularly unstable exactly where it is desirable to measure. This can be handled by averaging but which has similar problems as said extrapolation.

This kind of problems can thus be avoided thanks to embodiments herein. Also, simpler, and easier to manufacture, calibration objects can be used.

Embodiments herein thus provide improvements over the prior art.

BRIEF DESCRIPTION OF THE DRAWINGS

Examples of embodiments herein are described in more detail with reference to the appended schematic drawings, which are briefly described in the following.

FIG. 2 is for schematically illustrating a transformation that calibration may have to deal with.

DETAILED DESCRIPTION

Embodiments herein are exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

Figure 1:
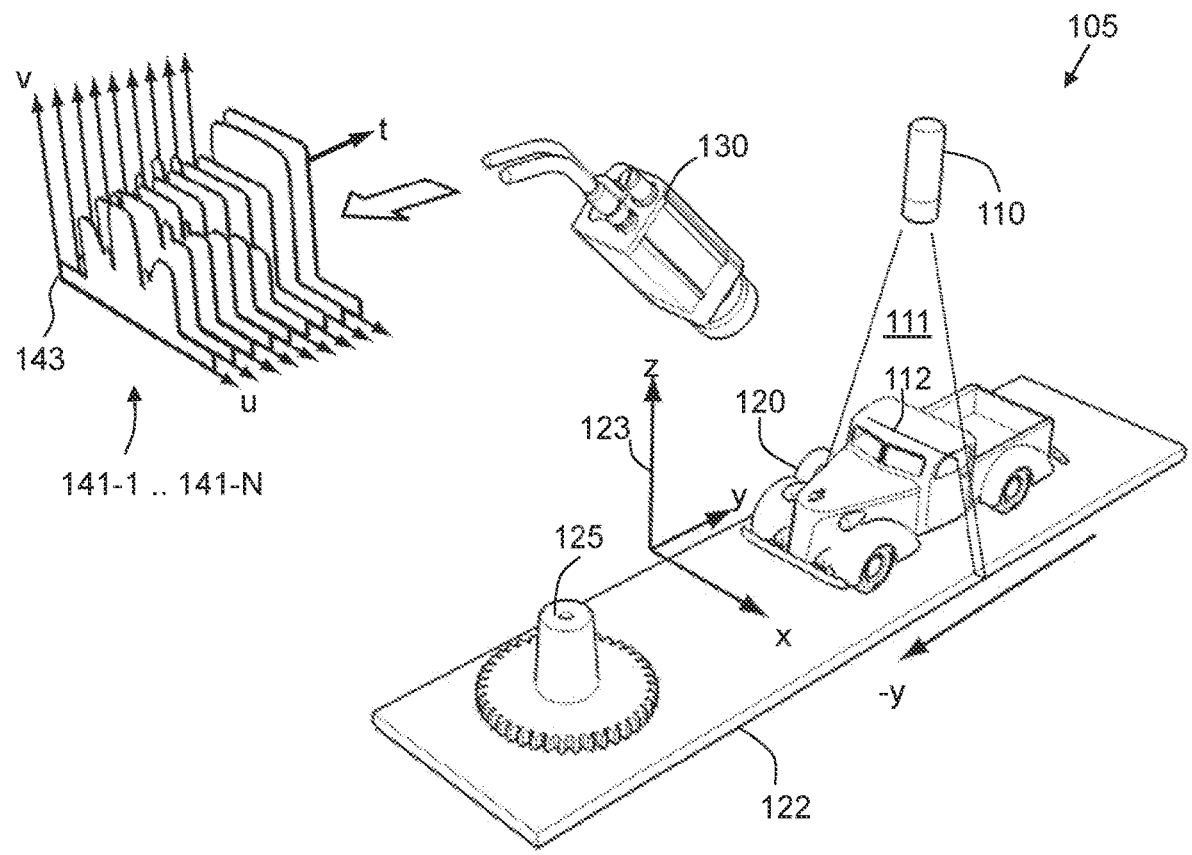
FIG. 1 schematically illustrates an example of a prior art type of imaging system.

FIG. 1 schematically illustrates an example of such type of imaging system as mentioned in the Background, namely an imaging system 105, for 3D machine vision, or simply 3D imaging, based on light triangulation, i.e. imaging for capturing information on 3D characteristics of measure objects. The system 105 is in the figure shown in a situation of normal operation, i.e. typically after calibration has been performed and the system is thus calibrated. The system 105 is example of a system that embodiments herein may be used and applied in relation to, such as involved in its calibration. The system 105 is configured to perform light triangulation, here using a sheet of light, that is, a light plane, as mentioned in the Background. The system 105 further comprises a light source 110, e.g. a laser, for illuminating measure objects to be imaged with a specific light pattern, in the figure exemplified and illustrated as a light plane 111. The light may, but not need to be, laser light. In the shown example, the target objects are exemplified by a first measure object 120 in the form of a car and a second measure object 121 in the form of a gear wheel construction. When the specific light pattern, e.g. light plane 111, is incident on an object, this corresponds to a projection of the specific light pattern on the object, which may be viewed upon as the specific light pattern, e.g. the light plane 111, intersects the object. For example, in the shown example, the light plane 111 results in a light line 112 on the first measure object 120. The specific light pattern, e.g. light plane 111, is reflected by the object, more specifically by portions of the object at the intersection, i.e. at the light line 112 in the shown example. The system 105 further comprises a camera 130 comprising an image sensor (not shown in FIG. 1). The camera and image sensor are arranged in relation to the light source 110 and the objects to be imaged so that the specific light pattern, when reflected by the objects, become incident light on the image sensor. The image sensor, typically implemented as a chip, is for converting incident light to image data. Said portions of the object, which by reflection causes said incident light on the image sensor, may thereby be captured by the camera 130 and the image sensor, and corresponding image data may be produced and provided for further use. For example, in the shown example, the light plane 111 will, at the light line 112 on a portion of the car roof of the first measure object 120, be reflected towards the camera 130 and image sensor, which thereby may produce and provide image data with information about said portion of the car roof. With knowledge of the setup, including the geometry, of the system 105, e.g. how image sensor coordinates relate to real world coordinates, such as coordinates of a coordinate system 123, e.g. Cartesian, relevant for the object being imaged and its context, the image data may be converted to information on 3D characteristics, e.g. a 3D shape or profile, of the object being imaged in a suitable format. The information on said 3D characteristics, e.g. said 3D shape(s) or profile(s), may comprise data describing 3D characteristics in any suitable format. As explained above, the calibration relates to finding out how the image sensor coordinates relate to real world coordinates.

By moving e.g. the light source 110 and/or the object to be imaged, such as the first measure object 120 or the second object 121, so that multiple portions of the object are illuminated and cause reflected light upon the image sensor, in practice, typically by scanning the objects, image data describing a more complete 3D shape of the object may be produced, e.g. corresponding to multiple, consecutive, profiles of the object, such as the shown profile images 141-1-141-N of the first measure object 120, where respective profile image shows a contour of the first object 120 where the light plane 111 was reflected when the image sensor of the camera 130 sensed the light resulting in the respective profile image. As indicated in the figure, a conveyor belt 122 or similar may be used to move the objects through the light plane 111, with the light source 110 and the camera unit 130 typically stationary, or the light plane 111 and/or the camera 130 may be moved over the object, so that all portions of the object, or at least all portions facing the light source 110, are illuminated and the camera 130 can receive light reflected from different parts of the object desirable to image.

As understood from the above, an image frame provided by the camera 130 and its image sensor, e.g. imaging the first measure object 120, may result in any one of the profile images 141-1-141-N. As mentioned in the Background, each position of the contour of the first object shown in any of the profile images 141-1-141-N are typically determined based on identification of intensity peaks in image data captured by the image sensor and on finding the positions of these intensity peaks, e.g. by means of one or more intensity peak finding algorithms. The system 105 and conventional peak finding algorithms are typically configured to, in each image frame, search for an intensity peak per pixel column. Sensor coordinates are u, v as indicted in the figure. The u-axis may be along image sensor rows and u may be used to indicate a position in such row, e.g. corresponding to an image sensor column. Correspondingly, the v-axis may be along image sensor columns and be used to indicate a position in such column, e.g. corresponding to an image sensor row.

For each position u of an image frame it may be searched for a peak position along v, e.g. by means of a peak finding algorithm as mentioned above, and the identified peaks in an image frame may result in one the profile images 141-1-141-N as shown in the figure. The profile images are formed by image points in a sensor based coordinate system 143, such as u, v, t. The total of image frames and profile images can be used to create a 3D image of the first object 120.

As a development towards embodiments herein, the situation indicated in the Background will first be further elaborated upon.

Figure 2:
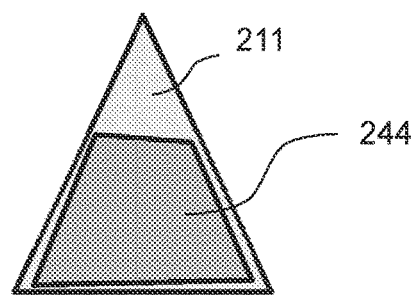

FIG. 2 is for schematically illustrating a situation relevant for 3D imaging system based on light triangulation, such as described above in relation to FIG. 1, and indicates a transformation that calibration may have to deal with. There is a light plane 211, typically laser plane, that may correspond to the light plane 111 discussed above. It is the intersection of this plane with an object that is imaged by the 3D imaging system. However, the camera of the 3D imaging system, such as the camera 130, has a field of view that typically is within and only partly covers the light plane. The intersection of the light plane and field of view of the camera, i.e. the field of view on the light plane 211, contain real world coordinates that map to the image sensor. The camera field of view within the light plane 211 typically correspond to a slightly distorted polygon 244 as schematically illustrated in the figure. The mapping, or transformation, between real world coordinates in the polygon 244 to image sensor coordinates, is thus desirable to get information about and use in calibration. When said mapping or transformation is known, it is realized that it can be determined real world coordinates from image sensor coordinates.

Figure 3A:
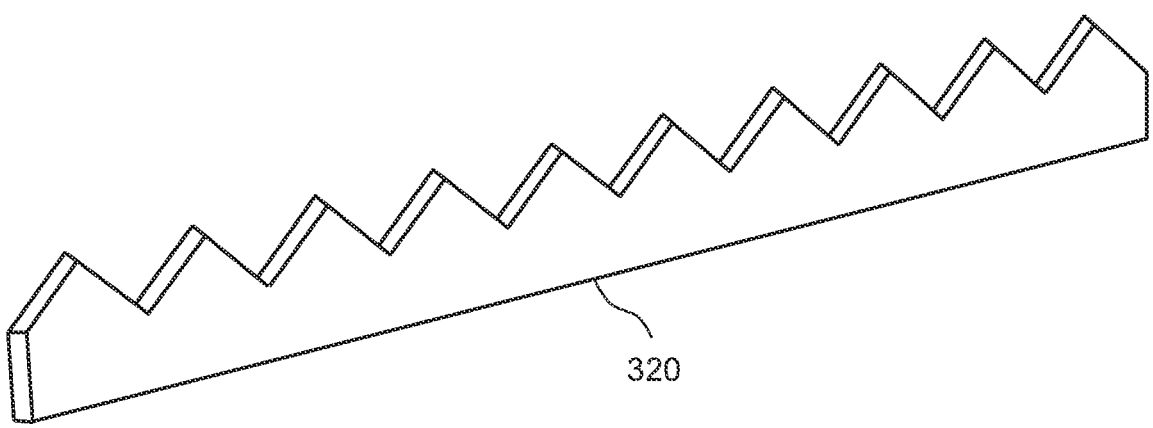
FIGS. 3A-C schematically illustrate examples relating to a prior art saw tooth shaped calibration object.
Figure 3B:
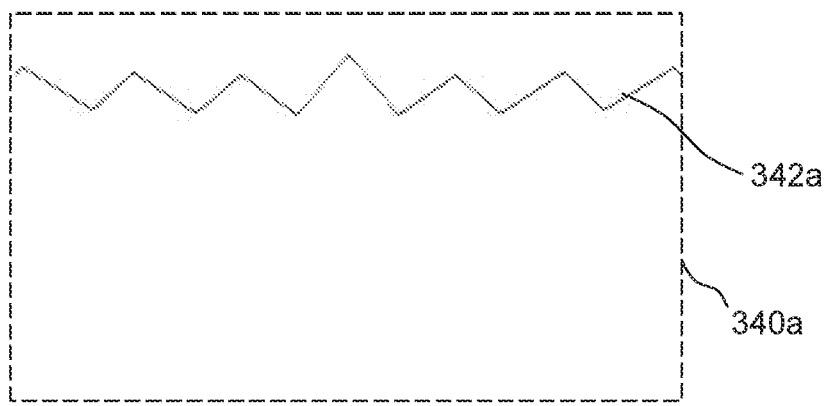
Figure 3C:
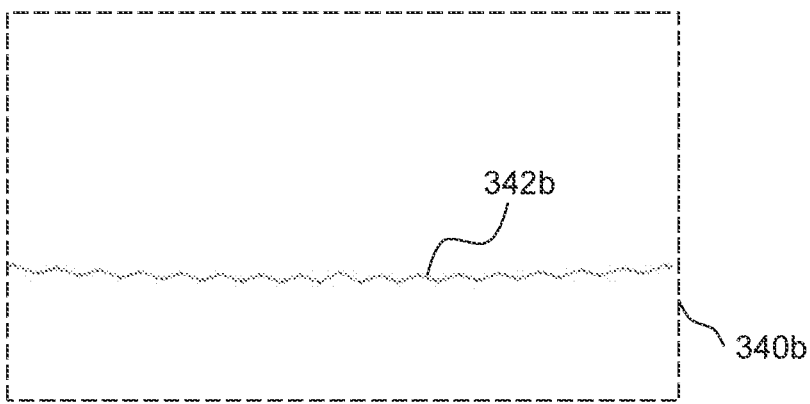

FIGS. 3A-C schematically illustrate examples relating to a prior art saw tooth shaped calibration object 320 as mentioned in the Background.

FIG. 3A schematically illustrates the calibration object 320 in 3D.

FIG. 3B schematically illustrates how the valleys and peaks of the saw tooths can look like in a first profile image 340a resulting from imaging of the calibration object when it was in a first predetermined position and orientation relatively close to the camera, for example when being imaged by the imaging system 105 and a camera 130. Reason for placing the calibration object 320 relatively closer to the camera is to be able to calibrate points that map to the upper part of the image sensor. The figure shows a profile line 342a corresponding to intensity peak positions of reflected light from the calibration object 320 captured by the image sensor of the camera. The profile line 342a contains information on positions of the valleys and peaks in image sensor coordinates. It is realized that the positions of the valleys and peaks can be extracted from the profile image 340a and will map to predetermined real world coordinates that the corresponding peaks and valleys had when the calibration object 320 was imaged at said first predetermined position relatively close to the camera.

FIG. 3C schematically illustrates how the valleys and peaks of the saw tooths can look like in a second profile image 340b resulting from imaging of the calibration object 320 when it was in a second predetermined position relatively further away from the camera. Reason for placing the calibration object relatively further away from the camera is to be able to calibrate points that map to the lower part of the image sensor. In the figure there is shown a profile line 342b corresponding to intensity peak positions of reflected light from the calibration object 320 captured by the image sensor of the camera. The profile line 342b contains information on positions of the valleys and peaks in image sensor coordinates. It is realized that the positions of the valleys and peaks can be extracted from the profile image 340b and will map to predetermined real world coordinates that the corresponding peaks and valleys had when the calibration object was imaged at second predetermined position relatively further away from the camera.

By comparing FIGS. 3B and 3C it is realized that it will be possible to more accurately determine sensor coordinates for valleys and apexes in FIG. 3B than FIG. 3C since resolution of the calibration object 320 is affected by the distance to the camera. As realized, this can negatively affect calibration and make it more difficult to accomplish desirable calibration for image sensor coordinates that map to light plane positions farther away from the camera, at least with conventional calibration as in the shown example.

Generally, better precision and more accurate measurements are possible closer to the camera, but on the other hand fewer features of a calibration object can be captured. This is due to the magnification and resolution problem of a triangulation setup as exemplified in relation to FIGS. 3A-C, where magnification and resolution of reference features of the calibration object change with the distance to the camera.

Also, depending on the calibration object used, certain areas and reference features to be used are often associated with various unwanted reconstruction artifacts or other biases resulting from the image acquisition procedure. For example, there may be problems with reflections in valleys that disturb measurements.

Also, due to manufacturing limitations, reference features, such as peaks, may not be possible to be provided as sharp as desirable but e.g. rounded. Therefore their position may need to be extrapolated based on the surfaces and lines that converge in the peaks. Apart from extraction issues there's also lens distortion present which makes it tricky to accurately extrapolate the peaks and valleys.

For other type of calibration objects than in the example of FIGS. 3A-C there may be other problems, such as with dots mentioned above. The use of intensity information may lead to triangulation artifacts at the dots whereby depth content can become particularly unstable exactly where it is desirable to measure. This can be handled by averaging but which has similar problems as said extrapolation.

It would be desirable with calibration that could avoid or at least reduce problems associated with calibration based on conventional calibration for 3D imaging systems based on light triangulation, such as mentioned above.

To sum up, in the prior art, detailed physical reference features, such as peak, valleys, dots, on calibration objects are used as real world calibration points with known, typically predetermined, real world coordinates in the light plane when imaged. Information about one or more such reference features are captured by the imaging system in a respective single image. In each such image the position of a real world calibration point, i.e. imaged reference feature, is identified in image sensor coordinates. The mapping between such calibration point's real world coordinates and image sensor coordinates is used in the calibration so that improved mapping between image sensor coordinates and real word coordinate thereafter is possible during live measurements, that is, during measurements where it is of interest to get information about an object in the real world from imaging by the imaging system. During live measurements it is of interest to determine information about the object in the real world, e.g. how it is positioned and/or its dimensions and/or shape. Through calibration it is possible to more accurately determine such information from the imaging system.

Embodiments herein are, as in the prior art, are based on mapping between a real world calibration point and an image sensor calibration point. However, instead of capturing calibration object features corresponding to the real world calibration point in a single image, as in the prior art, embodiments herein are based on the idea of using at least two images of two different light plane intersections with one or more surfaces, typically calibration object surface(s), each image capturing a line corresponding to such intersection. The image sensor calibration point then corresponds to a virtual intersection between the image lines. The real world calibration point corresponds to a virtual intersection between the real world lines corresponding to said light plane intersections with the surfaces in the real world.

This may be compared with the prior art, where one or more physical calibration features, e.g. from physical intersections of the calibration object, are captured as one or more calibration points in a single image.

An advantage of using surfaces and virtual intersections as calibration points, as in embodiments herein, is that negative effects associated with physical intersections and points, such as described above, can be avoided. Also, simpler, and easier to manufacture, calibration objects can be used.

Embodiments herein will in the following be explained in detail with reference to examples in text and drawings. However, first an imaging system will be described that embodiments herein can be performed with, and/or that fully or partly can be configured to perform embodiments herein.

Figure 4:
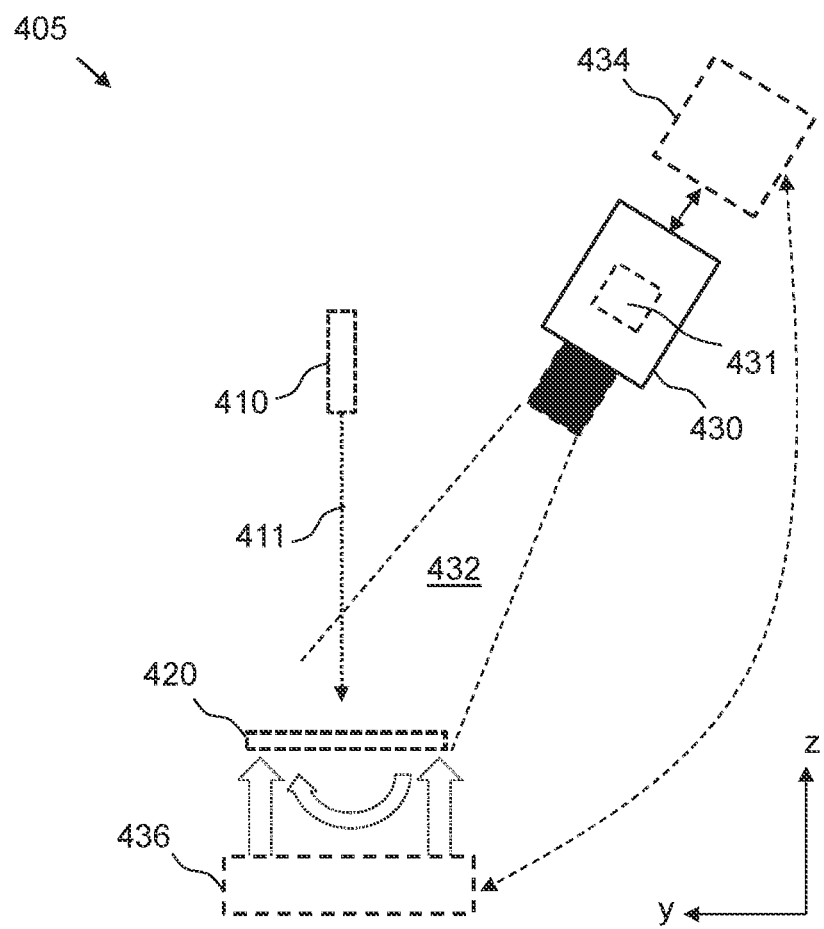
FIG. 4 schematically illustrates an example of an imaging system that embodiments herein can be performed with and/or that fully or partly can be configured to perform embodiments herein.

FIG. 4 schematically illustrates an example of an imaging system, namely an imaging system 405, that embodiments herein can be performed with and/or that fully or partly can be configured to perform embodiments herein.

What is shown is thus a simplified imaging system that can be configured to carry out embodiments herein, i.e. be involved for implementing embodiments herein.

The imaging system 405 is an imaging system for 3D imaging of objects based on light triangulation. It can be used for capturing information on 2D and 3D characteristics of one or more measure objects. During calibration, instead of imaging one or more measure objects, at least one calibration object 420 is imaged, or as in embodiments herein, one or more surfaces, that may be surfaces of one or more calibration objects, e.g. the calibration object 420 are, imaged.

This principle with real world and image sensor correspondence points for use in calibration of the imaging system is not different than conventionally and calibration based on embodiments herein are also based on mapping between real world calibration points and an image sensor calibration points, respectively. The difference relates to how the calibration points are provided and thereby also what calibration objects that can be used, as indicated above and described in further detail below.

The shown imaging system 405 can be considered to correspond to a basic configuration that comprises: A light source 410 for illuminating the measure object(s) and calibration object 420 with light 411, e.g. laser light, corresponding to a light plane, as part of light triangulation for 3D imaging. A camera 430 with image sensor 431 arranged for sensing reflected light from the measure object(s) and calibration object 420 as part of said light triangulation.

The camera 430, image sensor 431 and light source 410 are configured and positioned in relation to each other for light triangulation.

The calibration object 420 is in FIG. 4 shown located at least partly within field of view 432 of the camera 430. The light source 410 is configured to illuminate the measure object 420 with the light 411 that is reflected by the calibration object 420 and the reflected light is captured by the camera 430 and image sensor 431. Another example of light corresponding to a light plane that can be used is an edge of an area or portion with illumination.

The imaging system 405 may substantially correspond to a prior art imaging system, such as describe in relation to FIG. 1, but may be configured and/or be controlled a bit differently for calibration purposes, such as additionally be configured to perform with and/or according to embodiments herein as described further below. As already mentioned, embodiments herein also enable to use different one or more calibration objects than in the prior art, i.e. the calibration object 420 may be a conventional calibration object, or a different kind, typically simpler calibration object since it is sufficient to use one or more surfaces with embodiments herein, as will be further explained in the following.

The imaging system 405 may at least in some embodiments, comprise a calibration object positioning arrangement 436, i.e. an arrangement, such as apparatus, device or unit, for position change of one or more calibration objects for use with embodiments herein. For example, in some embodiments, the calibration object surfaces mentioned above and that are imaged to accomplish said virtual intersections, are surfaces of a single calibration object 420 as schematically exemplified in FIG. 4. The calibration object positioning arrangement 436 may thus be arranged to manipulate, e.g. reposition, the calibration object 420 between the two images so that surface(s) with different tilt are imaged and virtual intersections accomplished, as also will be further explained below. Different kind of calibration objects are also exemplified and described below, as well as how the manipulation such as repositioning of the calibration object can be accomplished in different embodiments.

In some embodiments, the imaging system 405 comprises one or more computing devices 434, e.g. a computer or device with similar capacity, for controlling at least some parts of the imaging system and/or performing computations for the calibration and/or perform the calibration to thereby be able to more accurately determine how points in the on the image sensor 431 map to points in light plane 411, and vice versa, or in practice, to better know how image sensor coordinates map to real world coordinates in the light plane 411, and vice versa.

The computations by the computing device(s) may relate to determination of the real world and image sensor correspondence points for use in calibration, which may also be referred to as calibration points. The image sensor correspondence points are typically in real world coordinates of a real world coordinate system in relation to the imaging system 405, and in image sensor coordinates of an image sensor coordinate system in relation to the image sensor 431, typically based on the image sensor pixel distribution.

The computations may be based on information, typically predetermined, about the calibration object 420 and how it is placed in the real world coordinate system and how it intersects the light plane 410 when imaged by the camera 430. For example, the computations may provide information about the real world coordinates of the intersection, corresponding to a real world line, between the light plane 411 and the calibration object 420 and/or virtual intersections between such real world lines, which virtual intersections correspond to real world calibration points in accordance with embodiments herein. This is further explained in relation to detailed examples below.

The computations may also be based on information from the camera regarding images taken by the camera of the calibration object 420 when it is intersecting the light plane, as mentioned above and further explained below. For example, the computations may provide information about image sensor coordinates of image lines corresponding to intensity peak positions in the images. The intensity peaks being caused by reflection where the light plane 411 intersected the calibration object 420 when the image was taken. Additionally the computations may provide information about virtual intersections between such image lines from different images, which virtual intersections correspond to image sensor points in accordance with embodiments herein.

The one or more computing devices 434 may further control the calibration object positioning arrangement 436.

In some embodiments, the one or more computing devices 434 and/or corresponding function and/or capacity is combined and/or integrated with the camera 430, or some other device of the imaging system 405.

The illumination is in the shown example in a vertical direction, i.e. parallel to the indicated z-axis and so that the illumination is in the z-x plane. However, as realized by the skilled person and from the below, other direction or directions of illumination, for example as used with conventional light triangulation, are possible to use with embodiments herein as well.

Figure 5A:
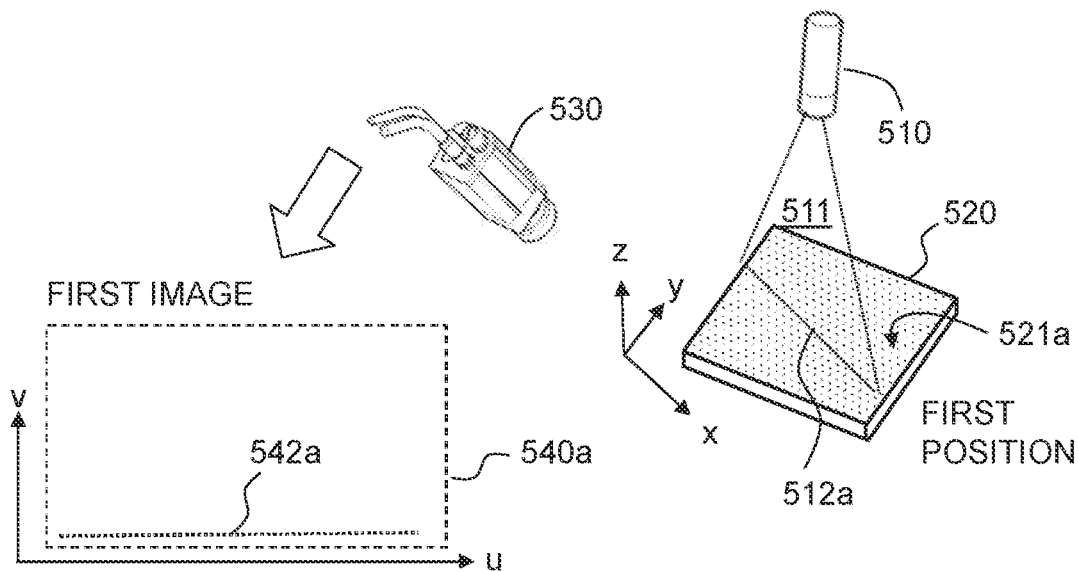
FIGS. 5A-C are for schematically illustrating and exemplifying some embodiments herein where a single surface is used to accomplish two different light plane intersections.
Figure 5B:
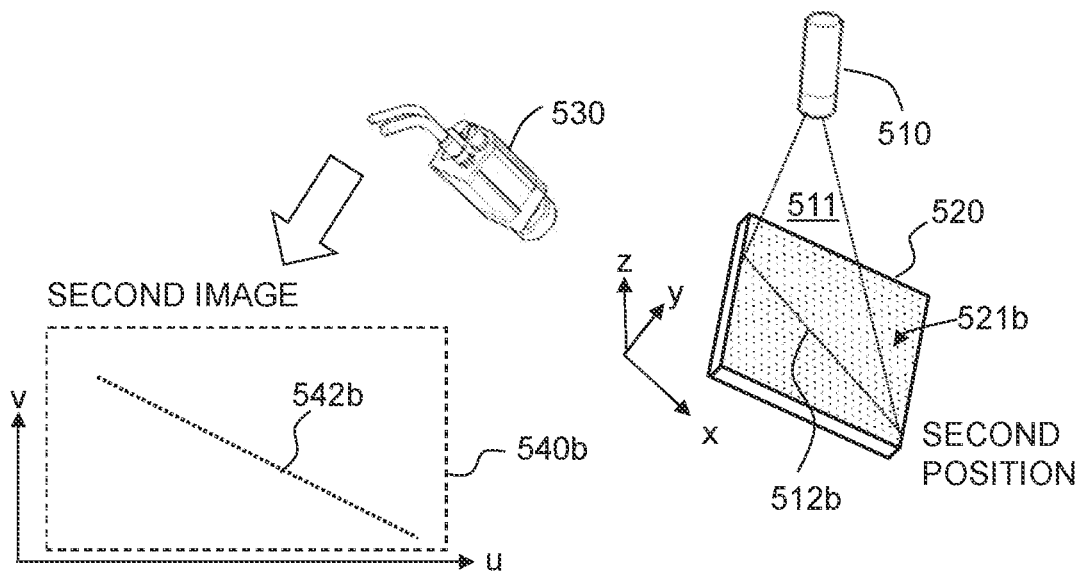
Figure 5C:
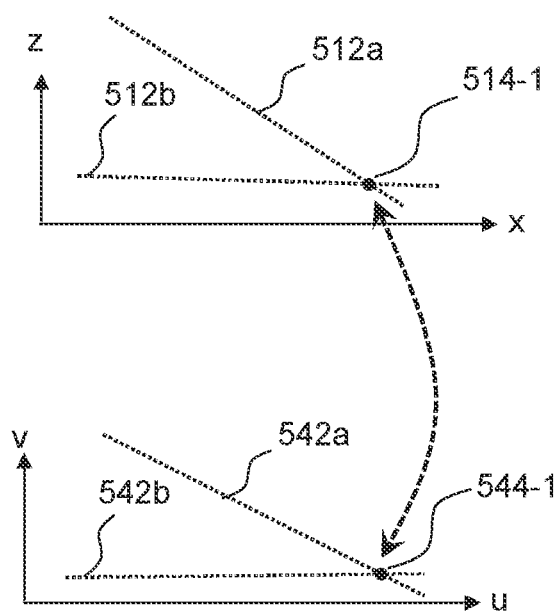

FIGS. 5A-C are for schematically illustrating and exemplifying some embodiments herein where a single physical surface is used to form calibration points, that is, a pair of real world and image sensor correspondence points for use in calibration of an imaging system for three dimensional imaging based on light triangulation.

In FIG. 5A, a calibration object 520 is in a first position and illuminated by a light source 510, more particularly the light source 510 provides a light plane 511 that in the shown situation intersects with a first real surface 521a of the calibration object 520 when the calibration object 520 is in a first position. The intersection is a first real intersection that corresponds to a first real world line 512a. The first real world line 512a is thus located in the light plane 511. There is also shown a camera 530 for imaging the calibration object 520 where it intersects the light plane 511. As should be realized, the light source 510 and the camera 530 is part of an imaging system for 3D imaging of objects based on light triangulation that may correspond to or be the imaging system 405 discussed above. Thus the light source 510 and the camera 530 may correspond to the light source 410 and the camera 430. As in conventional imaging systems based on light triangulation, the light plane 511 has a determined position in the imaging system, such as in relation to a real world coordinate system associated with the imaging system, typically in relation to the light plane. In the shown example a real world cartesian coordinate system x,y,z has been drawn and positioned so that light plane 511 is in the z-x plane.

Hence, the first real world light line 512a can be described by real world coordinates according to suitable coordinate system, e.g. z, x coordinates as in the shown example.

Note that the shown real world coordinate system is just an example and that, as the skilled person realizes, embodiments herein are not restricted to a particular coordinate system or how the coordinate system is located.

In FIG. 5A the calibration object 520 is thus in the first position, where the first real surface 521a, intersects the light plane 511, and is in this position imaged by the camera 530, so that a first image 540a is formed.

Hence, as should be realized and as a result from the light triangulation, that as such works according to conventional principles as described above, the first real world line 512a is imaged as a first image line 542a in the first image 540a and is thus in image sensor coordinates, in the figure denoted u, v. The first image line 542a, and similar such lines discussed herein, corresponds to positions of intensity peaks in an image captured by the image sensor, follows from how light triangulation for 3D imaging works, as explained above. The first image line 542a is thus typically a result from a peak finding method, e.g. algorithm, operating on the image data sensed by the image sensor of the camera 530. It should be realized that the peak finding method for finding positions of the intensity peaks can be and preferably is the same method that will be used for finding peak positions during normal operation of the imaging system, that is, after calibration.

It should further be realized that the first real world line 521a and the first image 540a with the first image line 542a, alone, are not very useful for calibration since no single positions or points are identified, only positions along respective line. This differs from the conventional case where an image used for calibration identifies at least one reference point of the calibration object for use in the calibration and that maps to a feature position on the calibration object. Compare, for example, with positions of peaks and valleys in the images 340a-b in FIGS. 3B-C.

Instead, according to embodiment herein, also another image will be used to form an image point for use in calibration.

In FIG. 5B, such another image, namely a second image 540b, is shown. In FIG. 5B, the calibration object 520 is in a second position and illuminated by the light source 510 that provides the light plane 511. The light plane 511 here intersects with a second surface 521b of the calibration object 520, which in the shown example corresponds to the first surface 521a but with a different orientation in the light plane 511 than in the situation depicted in FIG. 5A. That is, the calibration object 520 has been repositioned and thereby the physical surface intersecting the light plane 511 has changed orientation in the light plane 511 between the first image 540a and the second image 540b. The (new) light plane intersection corresponds to a second real world line 512b that virtually intersects the first real world line 512a in the light plane 511. The second real world line 512d is imaged as a second image line 542a in the second image 540b.

FIG. 5C, the upper part, schematically shows the virtual intersection of the real world lines 512a-b. This virtual intersection corresponds to a real world point 514-1. "Virtual" is used herein since the real world lines 512a-b are not at the same time in the light plane, but if the line would be in the light plane 511 at the same time they would intersect in the light plane 511. It is realized that with knowledge of real world coordinates of the light plane 511 and how respective surface 521a,b relates to, e.g. is positioned in the light plane 511 for the first position and the second position, that is, at the times the image sensor was exposed and the result was the first and second images 540a-b, the real world coordinates of the real world virtual intersection, and thus of the real world point 514-1, can be determined, e.g. computed. How respective surface 521a,b relates to, e.g. is positioned, in and intersects the light plane 511, and thus what the real world lines 512a-b will be, can for example be determined from knowledge of geometry of the calibration object 520 and how it relates to the light plane 511 in the first and second positions. In other words, with knowledge of the real world coordinates of the light plane 511, as typically known from set up of the light triangulation imaging system used, and knowledge of the, typically predetermined, geometries of the calibration object 520 and how it is placed in the real world coordinate system in the first and second positions, the real world lines 512a-b can be determined, e.g. computed. Thereby also the real world coordinates of the virtual intersection between these real world lines can be determined, which virtual intersection corresponds to the real world point 514-1. In fact, as should be realized, it suffice to know the coordinates of the surfaces 521a-b in the first and second positions, for example how these are mathematically expressed in the coordinate system when intersecting the light plane 511, to be able to determine, e.g. compute, the real world lines 512a-b and thereby the coordinates of the first virtual intersection that is the real world calibration point 514-1.

In FIG. 5C, lower part, it is schematically illustrated that also the imaged first and second real world lines, i.e. the first and second image lines 542a-b in the first and second images 540a-b, form another, second, virtual intersection that corresponds to an image sensor point 544-1 that maps to the real world point 514-1.

Hence, there is a real world point and an image sensor point that maps to each other and that calibration can be based on as in the prior art for calibration of light triangulation 3D imaging systems. The difference compared to the prior art is thus what constitutes the points used for the calibration.

The real world point 514-1 and the image sensor point 544-1 thus form a pair of real world and image sensor correspondence points for use in calibration of an imaging system for three dimensional imaging based on light triangulation.

Figure 5D:
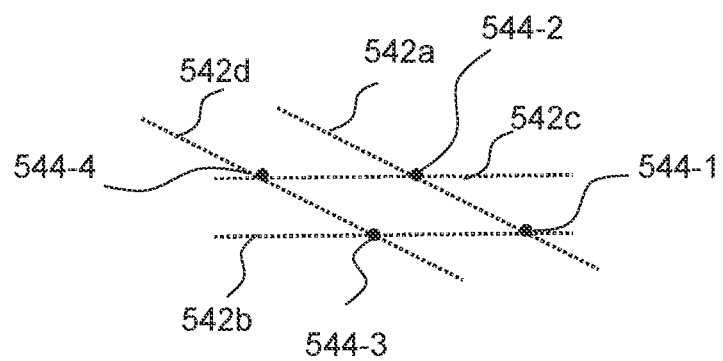
FIG. 5D schematically illustrates how the principle discussed above and shown in FIG. 5C easily can be extended to form further calibration points.

FIG. 5D schematically illustrates how the principle discussed above and shown in FIG. 5C easily can be extended to form further calibration points. For example that it suffices with two additional real world lines that correspond to two additional image lines 542c-d to form 3 additional, i.e. total 4, image sensor pints and corresponding real world points (not shown in FIG. 5D), that is, to in total form 4 pairs of real world and image sensor correspondence points.

The additional real world lines can be parallel to the first and second real world lines 512a-b and can thus be formed by simple straight displacement of the first and second surfaces in the light plane, e.g. by movement along the z-axis of the calibration object 520. The illustrated principle can be used to form multiple calibration points distributed over an image sensor area subject for calibration. An n number of parallel lines crossing an m number of other parallel lines result in a number of n*m intersections that thus can be used as calibration points. Of course also non parallel real world lines can be used to form even more possible calibration points per additional real world line, but may be simpler to accomplish parallel real world lines and may be simpler to form and determine virtual intersections if parallel real world lines are used.

Figure 5E:
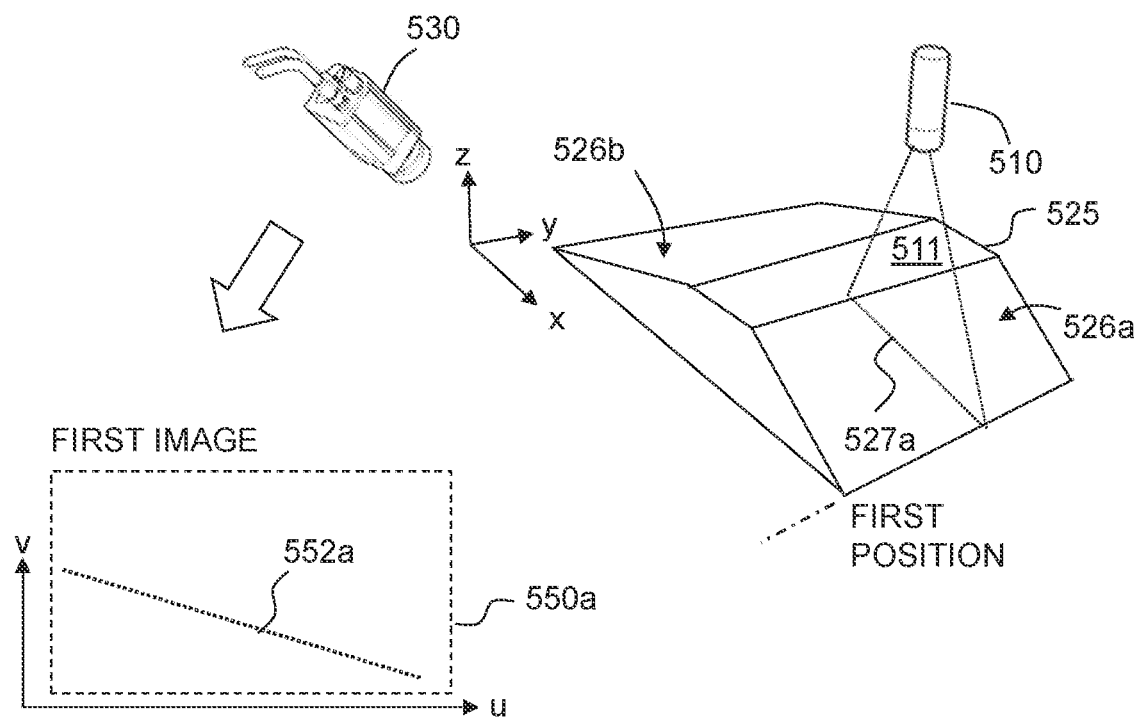
FIGS. 5E-F are for schematically illustrating and exemplifying some embodiments herein where two different surfaces are used to accomplish two different light plane intersections.
Figure 5F:
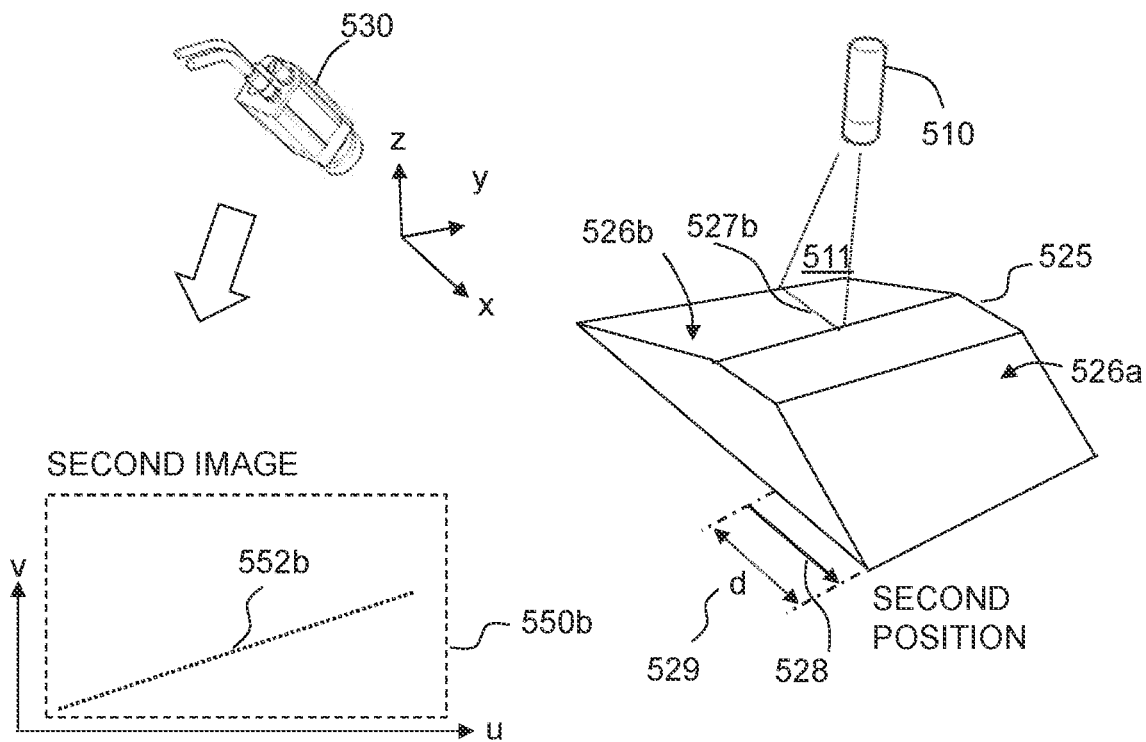
Figure 5G:
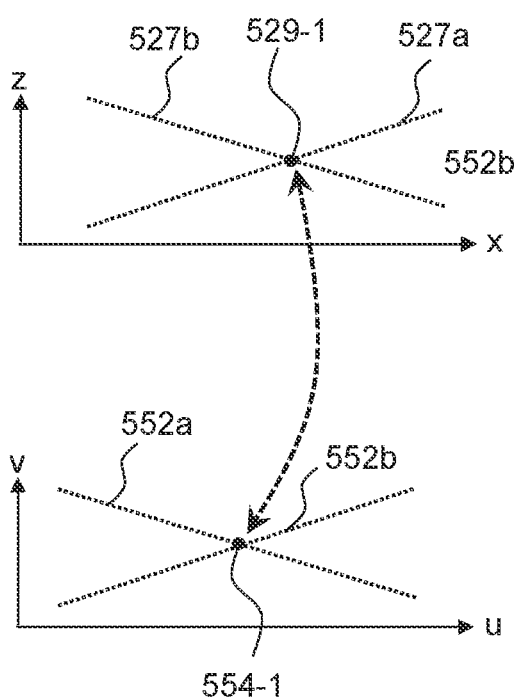
FIG. 5G schematically shows that virtual intersections and calibration points can be accomplished in a corresponding manner for embodiments exemplified in FIGS. 5E-F as for the embodiments exemplified in FIGS. 5A-B.

FIGS. 5E-G are for schematically illustrating and exemplifying some other embodiments that may be compared to the embodiments discussed above in relation to FIGS. 5A-C. Here are instead two different physical surfaces used. The light source 510, light plane 511 and the camera 530 are as in the embodiments relating to FIGS. 5A-B, and the imaging system involved may be the same. However, this is just an example for facilitating comparison. Focus will be on differences in the following.

In FIG. 5E, a calibration object 525 is in a first position and illuminated by the light source 510 that also here provides the light plane 511. In the shown situation the light plane 511 intersects with a first real surface 526a of the calibration object 525 when the calibration object 525 is in the first position. The intersection is a first real intersection that here corresponds to a first real world line 527a located in the light plane 511, which is imaged by the camera 530 and a first image 550a is formed. The imaged first real world line 527a corresponds to a first image line 552a.

It should be realized that the underlying principle here is the same as in the example of FIG. 5A.

In FIG. 5F, the calibration object 525 is in a second position. The light plane 511 here intersects with a second surface 527b of the calibration object 525, which in the shown example is another surface of the calibration object 525. To accomplish this, the calibration object 525 has in this example been moved a distance d, from the first position to the second position between the images, e.g. moved over a support surface on which the calibration is resting. As shown in the example, a simple straight, e.g. linear, movement of the calibration object tis sufficient. Such movement can be accomplished very accurately. The (new) light plane intersection corresponds to a second real world line 527*b* that virtually intersects the first real world line 527*a* in the light plane 511. The second real world line 527*b* is imaged as a second image line 552*b* in the second image 550*b*

FIG. 5G schematically shows that virtual intersections and thereby points can be accomplished in a corresponding manner for the embodiments exemplified in FIGS. 5E-F as they were for the embodiments exemplified in FIGS. 5A-B. More specifically, in the upper part of FIG. 5G, it is schematically shown the virtual intersection of the real world lines 527*a-b*. This virtual intersection corresponds to a real world point 529-1. In FIG. 5G, lower part, it is schematically illustrated that also the imaged first and second real world lines, i.e. the first and second image line 552*a-b* in the first and second images 550*a-b*, form a second virtual intersection that corresponds to an image sensor point 554-1 that maps to the real world calibration point 514-1. Hence, similar as for the other example above, the real world point 529-1 and the image sensor point 544-1 form a pair of real world and image sensor correspondence points for use in calibration of an imaging system for three dimensional imaging based on light triangulation.

Figure 6A:
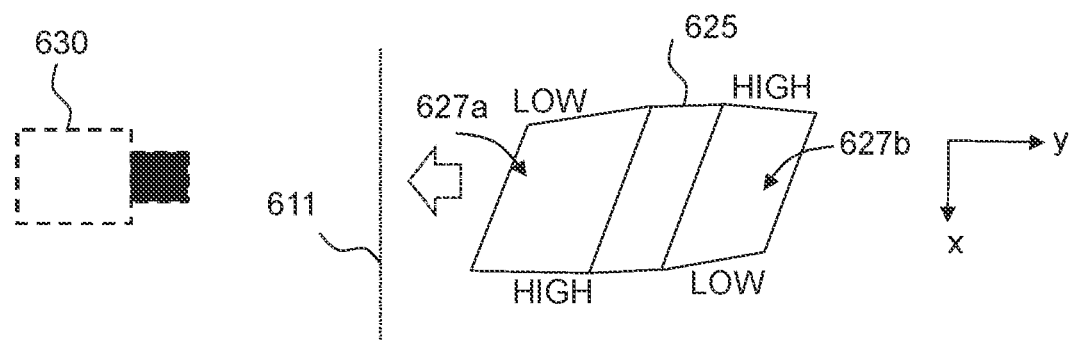
FIG. 6A-C are schematically illustrating and exemplifying how multiple calibration points can be accomplished based on embodiments herein.
Figure 6B:
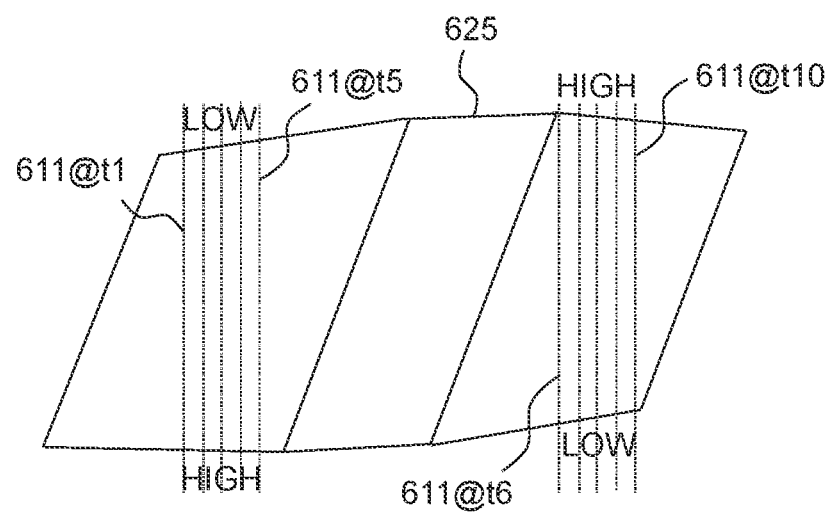
Figure 6C:
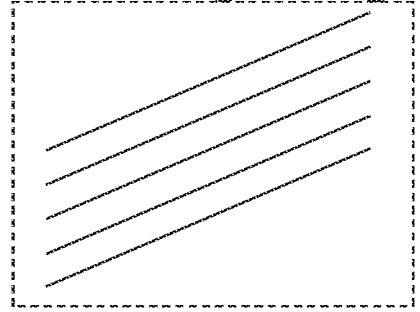
Figure 6C:
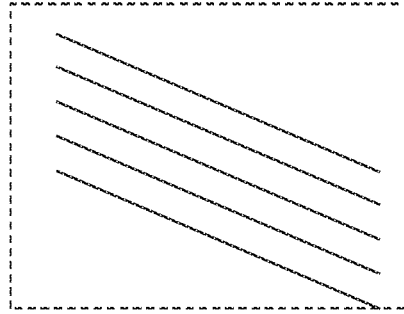
Figure 6C:
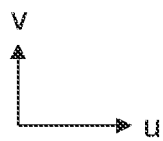
Figure 6C:
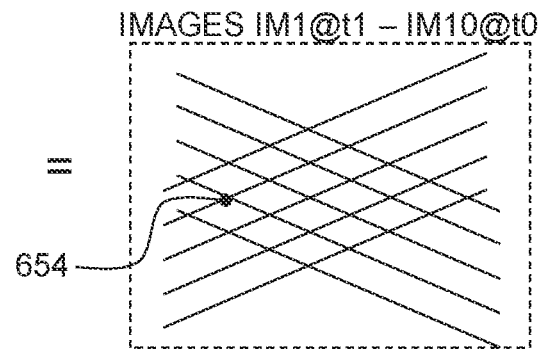

FIG. 6A-C are for schematically illustrating and exemplifying how multiple calibration points can be accomplished based on embodiments herein. The imaging system involved may correspond to the imaging system 405 and the situation can be compared to the situation in FIGS. 5E-F but with a calibration object 625 instead of the calibration object 525 and arranged a bit different in relation to a light plane 611 and a camera 630 than in FIG. 5E. Except for this, the light plane 611 and camera 630 may correspond to the light plane 511 and the camera 530 and be part of an imaging system that may correspond to the imaging system 405.

FIG. 6A is a top view with the z-axis (not shown) extending "upwards" perpendicularly to the shown x-y plane. The camera 611 is actually facing downwards in the z and x directions for imaging the light plane 611 in the z-x plane and thereby capture light from the reflections that will occur from the intersection between the light plane 611 and the calibration object 625. The imaging system that camera 630 is part of may be arranged to allow for scanning of the calibration object 625 by the light plane 611, for example by moving the calibration object 625 in the −y direction through the light plane 611, that is, in the direction illustrated by the big arrow in FIG. 6A. The calibration object 625 has first and second planar surfaces 627*a-b* that are not only having a slope in the z-y plane but also in the z-x-plane. The latter means that the upper and lower parts of each surface 627*a-b* in the figure, along the x-axis, will be at different heights, that is, at different z-coordinates, when the respective surface intersects the light plane 611. This is indicated by HIGH and LOW in the figure. Hence, with reference to FIG. 6A, for the first surface 627*a* at the same y-coordinate, the part "up" in the figure (at the text LOW) has lower height (in z) compared to the part "down" in the figure (at the text HIGH) that is at higher height (in z). As indicated in the figure, the opposite relation holds for the second surface 627*b*.

FIG. 6B schematically illustrates the calibration object 625 with examples of 10 intersections with the light plane 611, for example from said scan of the calibration object 634 through the light plane 611. The intersections are thus from different points in time, t1-t10. In the shown example there are 5 intersections between the light plane 611 and the first surface 627*a* at times t1-t5, denoted 611@t1 to 611@t5, and other 5 intersections between the light plane 611 and the second surface 627*b* at times t6-t10, denoted 611@t6 to 611@t10. Each intersection corresponds to a real world line just as discussed above in relation to FIGS. 5A-G, and when the surface is planar, the real world lines are linear. It is realized that with the camera 630 imaging reflected light from the intersections between the light plane 611 and the surfaces 627*a-b* at said time t1-t10, the result will be 10 images IM1-IM10, each with an image line corresponding to location of intensity peaks resulting from light reflected by respective surface 627*a-b* where it intersects the light plane 611. The image lines thus corresponds to how the real world lines are imaged but in image sensor coordinates, for example u, v instead of z, x. When there is a real world coordinate system x, y, z as indicated in FIG. 6A with the light plane 611 in the z-x plane, the real world lines, corresponding to the light plane intersections, are in the z-x plane and thus in z, x coordinates.

The underlying principle, relation between real world lines and image lines, etc. are the same as explained above in relation to FIGS. 5A-G.

FIG. 6C shows the result if the images IM1-IM5 with respective image lines imaging the respective real world lines 611@t1 to 611@t5 (that is, real word lines corresponding to light plane intersections with the first surface 627*a*) are combined in a single image. As can be seen, the result is 5 parallel image lines in u, v coordinates. The corresponding combination in to a single image is also shown for images IM6-IM10 with image lines imaging the real world lines 611@t6 to 611@t10 regarding the second surface 627*b*. The result here is other 5 parallel image lines.

As realized, and illustrated in the figure by the "+", if all images IM1-IM10 with the image lines are added, i.e. combined, the result is that respective group of parallel image lines regarding respective surface 627*a*, 627*b* are crossing each other, that is, are intersecting each other. Although the intersection can be visible and be present in a single image if combined as shown in FIG. 6C, they are better referred to as virtual intersections since the image lines are actually in different images resulting from imaging by the image sensor at said different times t1-t10. In practice, it is not necessary to actually combine into a single image to determine location of each intersection, it is for example possible to compare the images and/or compute location of the intersections. The intersections, similar as explained above in relation to for example FIG. 5A-G, correspond to image sensor points. As realized, and in corresponding manner as explained elsewhere herein, for example as above in relation to for example FIG. 5A-G, there is also virtual intersections between the real world lines in the light plane, i.e. in the z-x plane, and these virtual intersections corresponds to real world points. Just for example, an image sensor point 654 is indicated in FIG. 6C corresponding to one of the virtual intersections. The image sensor points are mapping to the real world points, respectively. In other words, the real world points and the image sensor points form pairs of real world and image sensor correspondence points for use in calibration of the imaging system.

Figure 7:
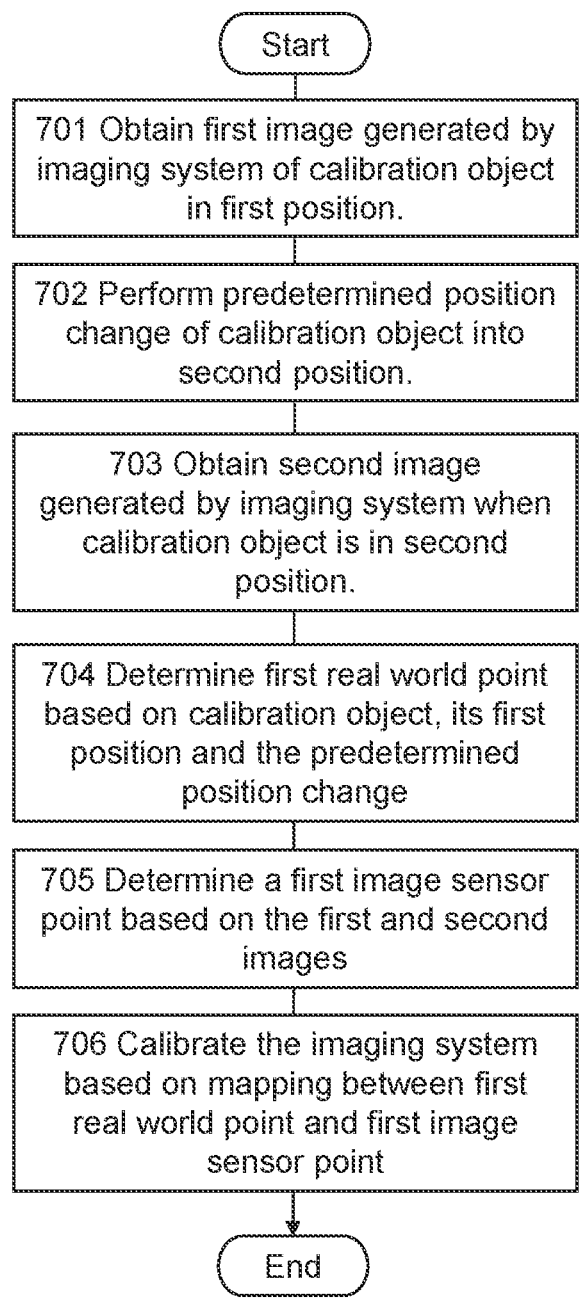
FIG. 7 is a flowchart for schematically illustrating embodiments of a method according to some embodiments herein.

FIG. 7 is a flowchart for schematically illustrating embodiments of a method according to some embodiments herein. The actions below, which may form the method, may be used for calibration of an imaging system for three dimensional, 3D, imaging of an object based on light triangulation. The imaging system comprises a camera with image sensor and a light source configured to provide light in a light plane, arranged so that light reflected by the object when intersecting said light plane becomes incident light on the image sensor. In the following, the imaging system may be exemplified by the imaging system 405, the light source by any one of the light sources 410, 510, 610, the light plane by any one or the light planes 411, 511, 611, the camera by any one of the cameras 410, 510, 610, the image sensor by the image sensor 431. Which specific device used as example depends on what is contextual suitable as example.

In the embodiments relating to FIG. 7, the object is a calibration object and the calibration is, as in the prior art, based on how a real world point in the light plane maps to an image sensor point that correspond to how said real world point is imaged on the image sensor 431 by the imaging system 405. In practice several such point pairs are used for the calibration. In the following, the calibration object may be exemplified by the calibration object 420, or any one of the calibration objects 520, 525, 625 if any of these are more contextual suitable as example.

The method and/or actions below and indicated in FIG. 7 may be performed by device(s), i.e. one or more devices, such as the imaging system 405, the camera 430, and/or the computing device(s) 434, and/or other suitable device(s). Device(s) for performing the method and actions thereof are also described below in some further detail.

The actions below may be taken in any suitable order and/or be carried out fully or partly overlapping in time when this is possible and suitable.

Action 701

It is obtained a first image, e.g. the first image 540*a*, generated by the imaging system 405 when the calibration object 520 was in a predetermined first position where a first surface of the calibration object 520, e.g. the first surface 521*a*, intersected the light plane 511. The intersection, corresponding to a first real world line, e.g. the first real world line 527*a*, may be predetermined or determined from knowledge about the calibration object 520 in the first position. The first image 540*a* comprises a first image line, e.g. the first image line 552*a*, resulting from how the imaging system 405 imaged the first real world line 527*a*. More specifically the first image line, or any image line here, as already mentioned above, typically corresponds to location of intensity peaks in image data resulting from exposure of the image sensor of the camera being used for the imaging.

Action 702

As discussed above in relation to FIG. 5A-B, there may be a position change of the calibration object 520, e.g. predetermined position change, in relation to its first position into a second position so that the second real world line 512*b* and the first real world line 512*a* will virtually intersect each other in said light plane 511. It is realized that the second real world line 512*b* can be determined, e.g. computed, based on knowledge of the calibration object, its first position and the position change.

An alternative to the position change is to use another calibration object with surface placed in the light plane to provide the second real world line. However, this require accurate placement of two calibration objects and it is more flexible to just move the calibration object, which for example allow for scanning as discussed above in relation to FIGS. 6A-C. In any case, it is realized that the two real world lines, both in the light plane, and their intersection can be mathematically determined, e.g. computed, from typically predetermined information regarding the setup of the imaging system, the calibration object and its first and second positions, where the latter position as mentioned can be determined from the position change.

In practice, everything regarding the calibration object and its placement to accomplish desirable real world point(s) for use in calibration are typically determined in advance, i.e. are predetermined.

Action 703

It is obtained another, second, image, e.g. the second image 540*b*, generated by the imaging system 405 when the calibration object 520 was in said second position where a second surface of the calibration object 520, e.g. the second surface 521*b*, intersected said light plane 511. The intersection, corresponding to a second real world line, e.g. the second real world line 512*b*, may be determined by the position change in Action 702 of the calibration object 520, e.g. predetermined position change, in relation to its first position so that the second real world line 512*b* and the first real world line 512*a* virtually intersect each other in said light plane 511 in a desirable way. The second image 540*b* comprises a second image line, e.g. the second image line 542*b*, corresponding to how the imaging system 405 imaged the second real world line 512*b*.

Action 704

The real world point, e.g. the real world point 514-1, is determined, e.g. computed, as a first virtual intersection between the first and second real world lines, e.g. between real world lines 512*a-b*.

Action 705

The image sensor point, e.g. the image sensor point 544-1, is determined as a second virtual intersection between the first and second image lines 542*a-b*.

For respective first and second images 540*a-b*, computations as in conventional light triangulation can be performed to find positions of points along the image sensor columns, corresponding positions of intensity peaks. A respective line equation, such as for image lines 542*a-b*, may then be adapted to fit these positions, preferably of higher order and not linear of $1^{st}$ order, but of such $2^{nd}$ or $3^{rd}$ order, or even higher orders. The intersection between the lines according to the line equations can then be computed and will thus correspond to an image sensor point, such as the image sensor point 544-1. Of course, also other methods for finding an intersection point between two image lines can alternatively be used, such as based combining the images with the lines, perform suitable image processing etc.

Action 706

The imaging system 405 may then be calibrated based on mapping between the real world point, such as the real world point 514-1, and the image sensor point, such as the image sensor point 544-1.

As explained above, the calibration will in practice typically involve several similar point pairs and mapping between these, e.g. distributed over the image sensor area and area of the light plane, which areas are to be involved in live measurements, i.e. during normal operation, after the calibration.

The calibration object or objects used with embodiments herein may have predetermined geometry and dimensions, which is also the case conventionally for calibration objects for light triangulation based 3D imaging systems. However, as already explained below, embodiments herein enable very simple calibration objects since only one or more surfaces, preferably planar, need to be used and be positioned in a desirable typically predetermined way or ways in the light plane.

As indicated above said real world lines and virtual intersections can be accomplished by an initial predetermined positioning of the calibration object in the light plane to accomplish a first real world line that is imaged as a first image line, and then predetermined position change(s) of the calibration object may be used to form further real world lines that are imaged as further image lines. The further real world lines can be determined, e.g., computed, from the first real world line, e.g. how it is defined and/or described in real world coordinates, and from information on how the calibration object is position changed.

Figure 8:
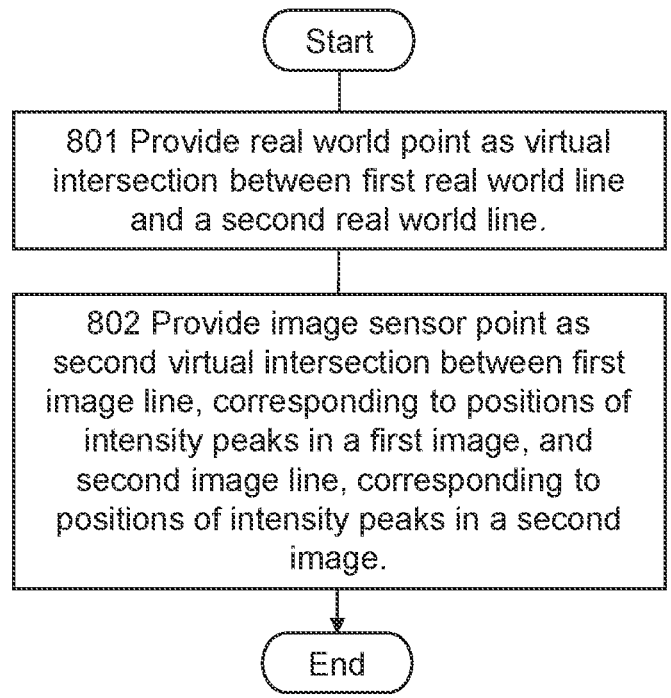
FIG. 8 is a flowchart regarding a method according to embodiments herein.

FIG. 8 is a flowchart regarding a method according to embodiments herein, which is more general than the method and examples described and discussed above, for example in connection with FIG. 7.

The method is for provision of a pair of real world and image sensor correspondence points for use in calibration of an imaging system, for example the imaging system 405, for three dimensional, 3D, imaging of objects based on light triangulation. The imaging system comprising a camera, such as the camera 430, 530 or 630, with image sensor, for example the image sensor 431, and a light source, such as the light source 410, 510 or 610, for provision of a light plane, e.g. the light plane 411, 511 or 611. Said light triangulation involving imaging by said camera of reflected light resulting from said light plane intersecting with and causing reflections from a surface. Said correspondence points being a real world point, for example the real world point 514-1 or 529-1, located in said light plane, and an image sensor point, for example the image sensor point 544-1 or 554-1, that corresponds to where said real world point is imaged on the image sensor by the imaging system.

The method and/or action below may be performed by device(s), i.e. one or more devices, such as the imaging system 405, the camera 430, and/or the computing device(s) 434, and/or other suitable device(s). Device(s) for performing the method and actions thereof are also described below in some further detail.

Action 801

Said real world point is provided as a first virtual intersection between a first real world line, such as the first real world line 512a or 527a, and a second real world line, such as the second real world line 512b or 527b. The first real world line, just as above, corresponds to a first real intersection between a first real surface, for example the first real surface 521a or 526a, and the light plane, and reflected light from said first real intersection is captured by the imaging system in a first image, such as the first image 540a or 550a. In other words, reflected light form the first real intersection is captured and thereby imaged in the first image by the imaging system and the image sensor thereof. Similarly, the second real world line corresponds to a second real intersection between a second real surface, such as the second real surface 521b or 527b, and the light plane, and reflected light from said second real intersection is captured by the imaging system in another, second, image, for example the second image 540b or 550b.

Said real surfaces may be named calibration surfaces or calibration object surfaces and may be part of one or more calibration objects. Calibration object, as used herein, refers to any physical object suitable for use in calibration of the imaging system and that have one or more surfaces corresponding to said first and second real surfaces. The calibration object, just as a conventional calibration object for calibration of a 3D imaging system based on light triangulation, typically has predetermined shape and size, i.e. geometry and dimensions.

However, note that in some embodiments herein, described below, a support surface for objects to be imaged may be used as the real surfaces, which is not normally referred to as a calibration surface or calibration object.

In some embodiments, the first real surface and the second real surface are parametric surfaces.

With said real, i.e. physical, surfaces being parametric, they can be described by a parametric equation, i.e. be mathematically expressed, which facilitates determining real world lines corresponding to the intersections between the surfaces and the light plane, and thereby determining what the virtual intersection between the real world lines will be.

Moreover, the surfaces should preferably have a continuous curvature, that is, has no abrupt changes as for example in the case of an apex, for example, the surfaces may be C1 continuous. Examples of preferred surfaces are planar, cylindrical or parabolic surfaces that thus respectively produce a real world intersection between the light plane and the surface that will correspond to a real world line that is straight, an arc or parabolic. In case of a cylindrical or parabolic surface it may be advantageous with a concave over a convex surface, since less light then will escape and more light be captured by the image sensor.

A curved surface, such as cylindrical or parabolic, may be preferred for the embodiments where a single surface is used since tilt or rotation of the surface, such as in the example relating to FIGS. 5A-B, thereby can be avoided. Real world lines that virtually intersect in the light plane can instead be accomplished by simple displacement, for example linear movement, of the surface between images.

In general, the surfaces should of course be such that are suitable for used in and being imaged by an imaging system based on light triangulation. For example, in case of a curved surface, it is implied that the curvature is not so extreme that it prevents imaging of the surface by the imaging system.

Although curved surfaces have some advantages as indicated above, planar surfaces, i.e. flat ones, may still be preferred in many situations as they have other advantages. For example, the real world lines and virtual intersection between these are easier to determine, e.g. compute. Planar surfaces typically result in simple geometries and computations. It is also easier to accurately produce planar real surfaces than real surfaces that are curved. Moreover, a planar real surface may allow for use of simpler production techniques. A planar surface should map to a straight line on the image sensor as illustrated in the examples of the drawings. However, as indicated above, the underlying principle of the invention does not by necessity require use of planar real surface(s). Some curvature or curved real surface(s) may be used instead. As long as the curvature and/or how the surface changes are known or can be determined, e.g. be mathematically described, so that the virtual intersection between the real world lines can be determined, e.g. computed, this suffice.

Further, as should be realized, the surfaces should be smooth, just as in the case of the surface of a conventional calibration object. There are no special requirements on surface smoothness regarding embodiments herein compared to the case with conventional calibration objects. The surfaces used for embodiments herein can thus have smoothness as surfaces of prior art calibration objects, that is, so there is no roughness with detrimental effect on accuracy. There is no problem in practice to produce a sufficiently smooth surface with almost any production method and independent of surface material, such as metal or plastic. The skilled person will also easily notice if there in practice would be problems due to surface roughness and then make sure to switch to and use another sufficiently smooth surface instead.

In some embodiments, said second real surface, e.g. the second real surface 521*b* or 527*b*, when it causes the reflected light captured in the second image, for example the second image 540*b* or 550*b*, has a position and orientation determined relative to position and orientation of the first real surface, such as the first real surface 521*a* or 527*a*, when it causes the reflected light captured in the first image, for example the first mage 540*b* or 550*b*, or vice versa. In other words, in some embodiments, said second real surface, where it intersects the light plane and causes the reflected light captured in the second image, has a position and orientation determined relative to the first real surface where it intersects the light plane and causes the reflected light captured in the first image, or vice versa.

This facilitates accomplishing desirable virtual intersections. One of the real surfaces, e.g. the first, may be placed with a known, e.g. predetermined position and orientation in the light plane for the first image, for example so that the resulting real world line can be simple to describe in real world coordinates. With the other, for example second, real surface determined in relation to the first real surface and its known position and/or orientation, it is enabled to position and/or orientate the second real surface for the second image in relation to and/or with assistance of the first real surface and its position and orientation. This enables a simplified procedure to accomplish positioning and orientation of the second real surface and thereby accomplish desirable virtual intersections and calibration points. For example, in embodiments with the real surfaces part of one and the same calibration object, such as described in relation to FIGS. 5A-G above, the calibration object can simply be physically repositioned and/or reorientated after the first image to result in a desirable and determined second real surface for the second image. In some embodiments there is a predefined and/or predetermined repositioning and/or reorientation of the calibration object between the first and second images.

An alternative is to, for example, position and orientate the real surfaces more independently from each other, e.g., with their own absolute predetermined position and orientation in the light plane for the two images. This may be preferred in case of separate calibration objects for the first and second real surfaces.

In some embodiments, the first and second real surfaces, e.g. the real surfaces 521*a-b* or 527*a-b*, are surfaces of a single calibration object, for example as in the case of the calibration objects 520 and 525. It is typically advantageous for reasons indicated above and elsewhere herein with a single calibration object. Alternatively, the first and second real surfaces are surfaces of separate calibration objects, i.e. a separate calibration object that provides respective calibration surface.

In some of these embodiments there is a position change of the calibration object, e.g. the calibration object 520 or 525, between said first and second images, e.g. the images 540*a-b* or 550*a-b*. The change in position, i.e. reposition, shall be so that the calibration object change position from where the first real surface, e.g. the first real surface 521*a* or 527*a*, intersects the light plane 511 for the imaging in the first image, such as the second image 540*b* or 550*a*, to another position where the second real surface, e.g. the second real surface 521*b* or 527*b*, intersects the light plane 511 for the imaging in the second image, such as the second image 540*b* or 550*b*.

That is, the position change is for accomplishing said imaging of the first and second real surfaces in the first and second images.

Different type of position changes are possible as mentioned herein. An alternative, at least in theory, to moving the calibration object is to move the light plane, and possibly also the camera, but this is typically a less good and less flexible solution since many imaging systems do not support this and it is typically much simpler, more versatile and straightforward to only change position of a measure object, such as the calibration object in this case.

The position change is preferably predefined or predetermined, i.e. determined in advance, to accomplish desirable calibration points as mentioned above.

It is realized that the accuracy of the position change affects how good the calibration can be, although the calibration principle as such of embodiments herein will work nevertheless. In practice it has turned out that today available devices, e.g. linear units, for mechanical positioning and position change, are so accurate that embodiments herein can accomplish more accurate calibration than what typically is possible through the aforementioned prior art methods, where the accuracy is limited by the physical features and intersections on the calibration object imaged in a single image.

In some embodiments, the position change is accomplished by means of machine controlled mechanical repositioning of the calibration object, e.g. by a so called linear unit, that e.g. may corresponds to or be comprised in the calibration object positioning arrangement 436. Commercially available linear units, or similar equipment, can perform repositioning with an accuracy and precision in the magnitude of micrometers ($\mu$m), e.g. about 1 $\mu$m in absolute precision is possible, which typically is sufficient for most practical applications.

As should be realized, the exact accuracy and precision required for repositioning used in the calibration depends on the requirements of the application, the resolution of the image sensor, geometries of the imaging system. etc. For a specific case the skilled person is able to calculate and/or perform routine testing and experimentation to find out about what accuracy and precision is sufficient. With said micrometer accuracy and prevision today available repositioning it is expected that calibration utilizing repositioning as in some embodiments herein will be a practical and advantageous alternative to conventional calibration objects used in calibration of 3D imaging systems based on light triangulation. Note that in some cases, even an industrial robot may provide sufficient accuracy for the mechanical repositioning and may in such cases be preferred to use, especially if such robot nevertheless is used where the 3D imaging system is installed, e.g. in order to manipulate, such as pick, objects identified and/or measured by the 3D imaging system.

The position change of the calibration object may in the embodiments with position change of the calibration object involve a movement of the calibration object over and/or along and/or on a support surface. It may be a support surface for the calibration specifically or be a measure object support surface, i.e., same support surface as for measure objects to be imaged "live", i.e. subsequent to calibration. The support surface may thus be supportive for objects to be imaged by the imaging system in normal operation, such as after it has been calibrated. For example, the calibration object 525 may be moved relative to the field of view of the camera 530 so that the second surface 526*b* is imaged instead of first surface 526a. The situation discussed and shown in relation to FIG. 6A-C may be even better to exemplify this.

The calibration object may thus be moved along and/or over the support surface, typically horizontally orientated, and on which the calibration object may rest when imaged. For example, the calibration object may by the movement be moved from a first to a second position on the support surface. The movement may advantageously be linear since linear movement is typically easier to accomplish with high accuracy and precision as already indicated above. In some embodiments, the movement comprises or is a rotation or tilt of the calibration object, e.g. as in the example of FIGS. 5A-B.

In some of the above embodiments, the first and second real surfaces, e.g. the real surfaces 526a-b, are separate surfaces of the single calibration object, e.g. the calibration object 525. The position change may in this case comprise, e.g. result from, movement of the calibration object, that is, so that the second real surface intersect the light plane instead of the first surface. For example, as in the example of FIGS. 5E-F, reposition of the calibration object 525 from its first position where the first real surface 527a intersects the light plane 511 for the imaging in the first image 550a to the other, second, position where the second real surface 527b insects the light plane 511 for the imaging in the second image 550b. The position change may comprise movement of the calibration object, e.g. the calibration object 525, along a support surface that the calibration object rests on, and/or that supports the calibration object, at least when imaged. For example, the calibration object may by the movement be moved from a first to a second position on the support surface as mentioned above in relation to FIGS. 5E-F.

In some embodiments, the movement comprise or is a linear movement of the calibration object, which is a movement relatively simply to control and new real world coordinates can relatively simply be computed from such movement and knowledge about geometry and dimensions of the calibration object.

Another advantage with embodiments where the calibration object is moved and/or repositioned on a support surface is that it can be introduced guiding and/or locking means and/or structures, e.g. on the calibration object and/or on the support surface, to ensure that the calibration object will be positioned where it should with sufficient accuracy and precision before, during and/or after the after the movement, thereby enabling relaxed, or removed, requirements on the movement as such.

In some embodiments, the first and second real surfaces, e.g. the real surfaces 521a-b, are the same real surface of the single calibration object, e.g. the calibration object 520, such as in the case of the example of FIGS. 5A-B. The position change may comprise that said same real surface is tilted between said first and second images so that said same real surface has a different orientation in the light plane when the second real line is formed than orientation of said same real surface in the light plane when the first real line is formed.

The surface tilt, e.g. accomplished by tilt or rotation of the calibration object, thus result in differently tilted imaged surface for the first and second images and said virtual intersections are in these embodiments resulting from the same, i.e. a single, real, or physical, surface of the calibration object. For example, reposition with tilt of the calibration object 520 may be from its first position where the first real surface 521a intersects the light plane 511 for the imaging in the first image 540a to another position where the second surface 521b, being the first real surface 521a after the repositioning with the tilt, intersects the light plane 511 for the imaging in the second image 540b. It is realized that these embodiments enable use of a very simple calibration object, only a single real surface, e.g. planar real surface, can be used and the calibration object may thus for example be a flat and or rectangular object. Such single planar real surface, e.g. of a flat calibration object, may be held by a positioning device, e.g. the calibration object positioning arrangement 436, in a first position, with the planar real surface intersecting the light plane 511 with a certain tilt, corresponding to the first real surface for the imaging in the first image 540a. Then the calibration object and the planar real surface is rotated or tilted to make the same real surface intersect the light plane 511 but with another tilt, corresponding to the second real surface for the imaging in the second image 540b. Even in that case a linear movement can be used to accomplish the tilt. In some of these embodiments the calibration object may correspond to such measure object support surface mentioned above, that is, same support surface as for measure objects to be imaged "live", i.e. subsequent to calibration, and that is tiltable. For example, a movable, e.g. tiltable and height adjustable, such support surface can be used. However, in practice it may be desirable to avoid this since this kind of support surface is typically involved in long time operation outside the calibration as such, which can be detrimental to precision and accuracy desirable to maintain for calibration Note that there, separate from any such repositioning by movement discussed above to accomplish the intersection of the first and second real world lines, in some embodiments may be movement, also preferably linear for similar reason as already discussed, vertically of the calibration object, to thereby accomplish height variations, i.e. the first surface and the second surface may be linearly moved closer and/or further away from the camera and these surfaces be imaged at different distances from the image sensor. Thereby it can be accomplished multiple parallel lines from each surface in different images, respectively, as separately described herein, with the result that multiple intersections of lines can be provided, with intersections distributed over the image sensor area. Additionally, or alternatively, multiple intersections of real world lines at different heights may be accomplished by imaging different parts, with different height profile, of a tilted calibration object surface, such as exemplified in relation to FIGS. 6A-C.

Action 802

Said image sensor point, such as the image sensor point 544-1 or 554-1, is provided as a second virtual intersection between a first image line, for example the first image line 542a or 552a, corresponding to positions of intensity peaks of said captured light in the first image, such as the first image 540a or 550a, and a second image line, for example the second image line 542b or 552b, corresponding to positions of intensity peaks of said captured light in the second image, such as the second image 540b or 550b.

The second virtual intersection, corresponding to the image sensor point, is thus between image lines from separate images, i.e. from different exposures of the image sensor. This may be compared with the prior art where calibration points, e.g. from physical intersections, are captured by a single image.

An advantage of using surfaces and virtual intersections, as in embodiments herein, is that negative effects associated with physical intersections and points, such as described in the Background and above, can be avoided. Also, simpler, and easier to manufacture, calibration objects can be used.

Hence, in short, the method described above in relation to FIG. 8 is for provision of a pair of real world and image sensor correspondence points for use in calibration of an imaging system, such as the imaging system 405, for three dimensional imaging based on light triangulation. The real world point, e.g. the real world point 514-1 or 529-1, being provided as a first virtual intersection between a first real world line, such as the first real world line 512*a* or 527*a*, and a second real world line, for example the second real world line 512*b* or 527*b*. Said image sensor point, e.g. the image sensor point 544-1 or 554-1, being provided as a second virtual intersection between a first image line, such as the first image line 542*a* or 552*a*, and a second image line, for example the second image line 542*b* or 552*b*. A first image, for example the first image 540*a* or 550*a*, by the imaging system comprises captured light that images the first real world line. A second image, for example the second image 540*b* or 550*b*, by the imaging system comprises captured light that images the second real world line. The first image line corresponds to positions of intensity peaks of said captured light in the first image and the second image line corresponds to positions of intensity peaks of said captured light in the second image.

It should be realized that the principle described above in relation to FIG. 8 works for any first and second real surfaces that through said real intersections with the light plane result in a first virtual intersection between real world lines in the light plane and that thereby, through said imaging in the light triangulation system, also result in a second virtual intersection between image lines as described above.

With knowledge about real world coordinates of said real surfaces in the intersection with the light plane when the images are captured, the real world lines corresponding to respective intersection can be determined, for example be mathematically and/or numerically described in real world coordinates of a real world coordinate system.

The real world coordinates of the second real intersection may be determined, e.g. computed, from a position change of a calibration object comprising the first and second real surfaces, such as discussed above. The real world coordinates may be in a suitable real world coordinate system, for example suitably selected in relation to the imaging system and the light plane, and/or the position change, in order to facilitate determining the real world lines and their virtual intersection.

In principle, said real surfaces and real world lines may be determined as part of the calibration, e.g. by determining the real world coordinates thereof mathematically or numerically, but are preferably predefined or predetermined, i.e. so that the real world lines will have known coordinates in the real world coordinate system. This can involve accurate positioning and/or repositioning of a calibration object with predetermined geometry and dimensions, and having at least one real surface, so that the real surface(s) intersects the light plane in a suitable way to form a desirable pair of real world and image sensor correspondence points.

In practice, a calibration object with surface(s) to intersect the light plane and be imaged may be predetermined, e.g. formed with predetermined desirable dimensions and shape, for positioning in the light plane, for example with an initial position to be position changed, for example through movement of the calibration object, in a predetermined way to new positions intersecting the light plane in order to accomplish desirable real world points, that thus also may be predetermined, and thereby also accomplish corresponding image sensor points through imaging of the calibration object surface(s) in said positions. Instructions for placing and moving the calibration object can in other words be predetermined as well and be associated with the calibration object. Thus, in practice, to accomplish several pairs of real world and image sensor correspondence points for use in calibration of an imaging system, it can be a matter of placing, moving and imaging the predetermined calibration object using the imaging system and in accordance with predetermined instructions, i.e. in a predetermined way. Movement of the calibration object to accomplish said position change is advantageously performed by an arrangement for this purpose, such as the calibration object positioning arrangement 436. It is realized from this that provision of the correspondence points, and calibration, in practice can be a relatively simple procedure for a user and that can be automated to a great extent.

Where the real world point, and thus first virtual intersection should be located, can either be a predetermined position in the light plane that is relevant for subsequent "live" imaging of and measurements on measure objects by the imaging system, i.e. during normal operation, and thus is relevant also for calibration. Then can further such real world calibration points be suitably determined in relation to the involved real world lines so there will be further real world points distributed in the part of the light plane that is relevant for the calibration, i.e. typically the part of the light plane that will be intersected by the measurement objects during said normal operation. It is thereafter a matter of making sure to use surfaces in the calibration that, when they intersect the light plane, result said real world lines. This can, as explained elsewhere herein, involve provision of certain one or more calibration objects having one or more surfaces and/or suitable manipulation of this/these calibration object(s) between images. Respective real world line will be imaged as a respective image line, and the image lines will virtually intersect when the real world lines intersect in the light plane due to how light triangulation based imaging works and imaging systems for this are configured.

It can be noted that even before calibration has been performed there is a mathematical rough mapping from real world coordinates in the light plane to image sensor coordinates and vice versa exist. This rough mapping follows from and can be determined by trigonometry from known relations and geometries of the imaging system and how it has been set up for the light triangulation. However, as explained above, this mapping is typically not sufficiently accurate and since calibration therefore nevertheless is needed, finding mapping between real world and image sensor correspondence points, such as based on embodiment herein, is typically preferred.

The method above, as well as the method discussed in relation to FIG. 7, can alternatively be described as method and/or action of mapping, or finding a mapping, between the real world point and image sensor point for use in calibration of the imaging system.

Figure 9:
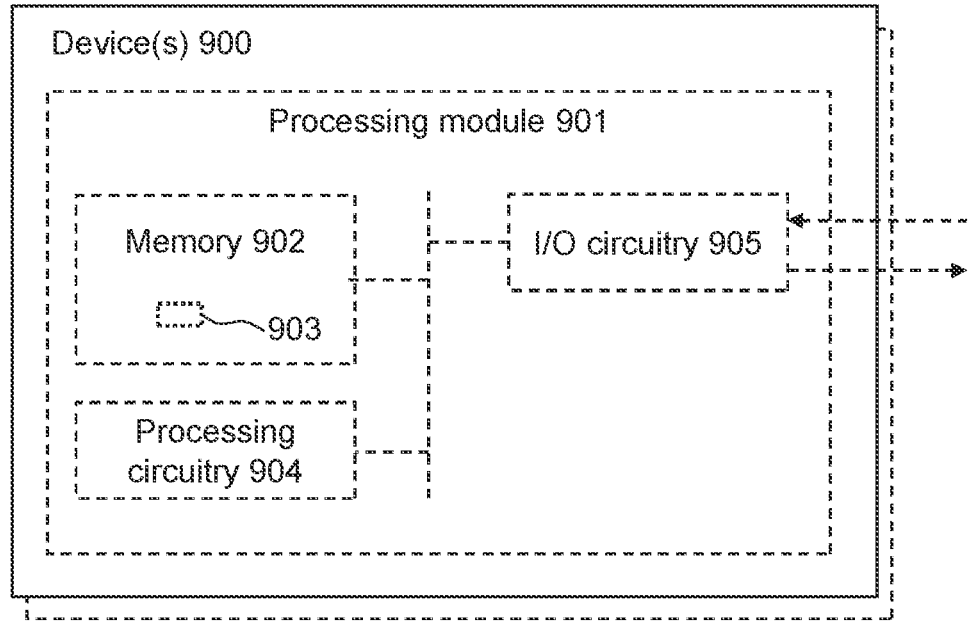
FIG. 9 is a schematic block diagram for illustrating embodiments of how one or more devices may be configured to perform the method and actions discussed in relation to FIG. 7 and FIG. 8.

FIG. 9 is a schematic block diagram for illustrating embodiments of how one or more devices 900, e.g. corresponding to or comprised in the imaging system 405, such as the camera 430 and/or the computing device(s) 434, may be configured to perform the method and actions discussed in relation to FIG. 7 and FIG. 8. Hence, the device(s) 900 is for said provision of said pair of real world and image sensor correspondence points for use in calibration of said imaging system for three dimensional imaging based on light triangulation, e.g. the imaging system 405.

The device(s) 900 may comprise a processing module 901, such as processing means, one or more hardware modules, including e.g. one or more processing circuits, circuitry, such as processors, and/or one or more software modules for performing said method and/or actions.

The device(s) 900 may further comprise memory 902 that may comprise, such as contain or store, a computer program 903. The computer program 903 comprises 'instructions' or 'code' directly or indirectly executable by the device(s) 900 to perform said method and/or action(s). The memory 902 may comprise one or more memory units and may further be arranged to store data, such as configurations, data and/or values, involved in or for performing functions and actions of embodiments herein.

Moreover, the device(s) 900 may comprise processing circuitry 904 involved in processing and e.g. encoding data, as exemplifying hardware module(s) and may comprise or correspond to one or more processors or processing circuits. The processing module(s) 901 may comprise, e.g. 'be embodied in the form of' or 'realized by' the processing circuitry 904. In these embodiments, the memory 902 may comprise the computer program 903 executable by the processing circuitry 904, whereby the device(s) 900 is operative, or configured, to perform said method and/or action(s).

The device(s) 900, e.g. the processing module(s) 901, may comprise Input/Output (I/O) module(s) 905, configured to be involved in, e.g. by performing, any communication to and/or from other units and/or devices, such as sending and/or receiving information to and/or from other devices. The I/O module(s) 905 may be exemplified by obtaining, e.g. receiving, module(s) and/or providing, e.g. sending, module(s), when applicable.

Further, in some embodiments, the device(s) 900, e.g. the processing module(s) 901, comprises one or more of provision or calibration module(s), as exemplifying hardware and/or software module(s) for carrying out actions of embodiments herein. These modules may be fully or partly implemented by the processing circuitry 904.

Hence:

The device(s) 900, and/or the processing module(s) 901, and/or the processing circuitry 904, and/or the I/O module(s) 905, and/or the provision or calibration module(s), are operative, or configured, to provide said real world point as said virtual intersection between the first real world line and the second real world line, wherein said first real world line corresponds to said first real intersection between the first real surface and the light plane and wherein said reflected light from said first real intersection is imaged by the imaging system in said first image, and wherein said second real world line corresponds to said second real intersection between the second real surface and the light plane and wherein said reflected light from said second real intersection is imaged by the imaging system in said another, second, image.

The device(s) 900, and/or the processing module(s) 901, and/or the processing circuitry 904, and/or the I/O module(s) 905, and/or the provision or calibration module(s), are further operative, or configured, to, provide said image sensor calibration point as said second virtual intersection between the first image line corresponding to positions of intensity peaks of said captured light in the first image and said second image line corresponding to the positions of the intensity peaks of said captured light in the second image.

Figure 10:
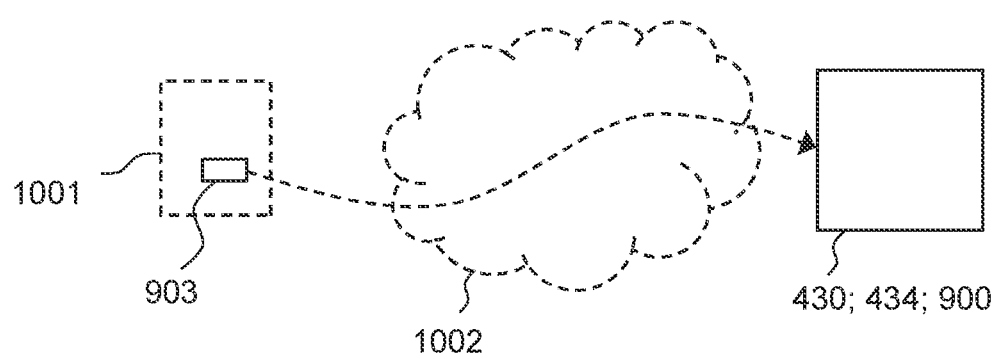
FIG. 10 is a schematic drawing illustrating some embodiments relating to computer program and carriers thereof.

FIG. 10 is a schematic drawing illustrating some embodiments relating to computer program and carriers thereof to cause said device(s) 900 discussed above to perform said method and actions.

The computer program may be the computer program 903 and comprises instructions that when executed by the processing circuitry 904 and/or the processing module(s) 901, cause the device(s) 900 to perform as described above. In some embodiments there is provided a carrier, or more specifically a data carrier, e.g. a computer program product, comprising the computer program. The carrier may be one of an electronic signal, an optical signal, a radio signal, and a computer readable storage medium, e.g. a computer readable storage medium 1001 as schematically illustrated in the figure. The computer program 903 may thus be stored on the computer readable storage medium 1001. By carrier may be excluded a transitory, propagating signal and the data carrier may correspondingly be named non-transitory data carrier. Non-limiting examples of the data carrier being a computer readable storage medium is a memory card or a memory stick, a disc storage medium, or a mass storage device that typically is based on hard drive(s) or Solid State Drive(s) (SSD). The computer readable storage medium 1001 may be used for storing data accessible over a computer network 1002, e.g. the Internet or a Local Area Network (LAN). The computer program 903 may furthermore be provided as pure computer program(s) or comprised in a file or files. The file or files may be stored on the computer readable storage medium 1001 and e.g. available through download e.g. over the computer network 1002 as indicated in the figure, e.g. via a server. The server may e.g. be a web or File Transfer Protocol (FTP) server or similar. The file or files may e.g. be executable files for direct or indirect download to and execution on said device(s) to make it perform as described above, e.g. by execution by the processing circuitry 904. The file or files may also or alternatively be for intermediate download and compilation involving the same or another processor(s) to make them executable before further download and execution causing said device(s) 900 to perform as described above.

Note that any processing module(s) and circuit(s) mentioned in the foregoing may be implemented as a software and/or hardware module, e.g. in existing hardware and/or as an Application Specific Integrated Circuit (ASIC), a Field-Programmable Gate Array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the device(s), sensor(s) etc. to be configured to and/or to perform the above-described methods and actions.

Identification by any identifier herein may be implicit or explicit. The identification may be unique in a certain context, e.g. for a certain computer program or program provider.

As used herein, the term "memory" may refer to a data memory for storing digital information, typically a hard disk, a magnetic storage, medium, a portable computer diskette or disc, flash memory, Random Access Memory (RAM) or the like. Furthermore, the memory may be an internal register memory of a processor.

Also note that any enumerating terminology such as first device, second device, first surface, second surface, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

When using the word "comprise" or "comprising" it shall be interpreted as nonlimiting, i.e. meaning "consist at least of".

The embodiments herein are not limited to the above described embodiments. Various alternatives, modifications and equivalents may be used. Therefore, the above embodiments should not be taken as limiting the scope of the present disclosure, which is defined by the appending claims.

The invention claimed is:

1. A method performed by one or more devices (405; 430; 434; 900), for provision of a pair of real world and image sensor correspondence points for use in calibration of an imaging system (405) for three dimensional imaging based on light triangulation, said imaging system comprising a camera (430; 530) with image sensor (431) and a light source (410; 510) for providing a light plane (411; 511), said light triangulation involving imaging by said camera of reflected light resulting from said light plane (411; 511) intersecting with and thereby causing reflections from a surface, said correspondence points being a real world point (514-1; 529-1), located in said light plane (411; 511), and an image sensor point (544-1; 554-1) that corresponds to where said real world point (514-1; 529-1) is imaged on the image sensor (431) by the imaging system (405), wherein the method is characterized by:
providing (801) said real world point (514-1; 529-1) as a first virtual intersection between a first real world line (512*a*; 527*a*) and a second real world line (512*b*; 527*b*), wherein said first real world line (512*a*; 527*a*) corresponds to a first real intersection between a first real surface (521*a*; 526*a*) and the light plane (511) and wherein reflected light from said first real intersection is captured by the imaging system (405) in a first image (540*a*; 550*a*), and
wherein said second real world line (512*b*; 527*b*) corresponds to a second real intersection between a second real surface (521*b*; 527*b*) and the light plane (411; 511) and wherein reflected light from said second real intersection is captured by the imaging system (405) in another, second, image (540*b*; 550*b*); and
providing (802) said image sensor point (544-1; 554-1) as a second virtual intersection between a first image line (542*a*; 552*a*) corresponding to positions of intensity peaks of said captured light in the first image (540*a*; 550*a*) and a second image line (542*b*; 552*b*) corresponding to positions of intensity peaks of said captured light in the second image (540*b*; 550*b*).

2. The method as claimed in claim 1, wherein the first real surface (521*a*; 526*a*) and the second real surface (521*b*; 527*b*) are parametric surfaces.

3. The method as claimed in claim 1, wherein said second real surface (521*b*; 527*b*), when it causes the reflected light captured in the second image (540*b*; 550*b*), has a position and orientation determined relative to position and orientation of the first real surface (521*a*; 527*a*) when it caused the reflected light captured in the first image (540*b*; 550*b*).

4. The method as claimed in claim 1, wherein the first and second real surfaces (521*a-b*; 527*a-b*) are surfaces of a single calibration object (420; 520; 525).

5. The method as claimed in claim 4, wherein there is a position change of the calibration object (420; 520; 525) between said first and second images (540*a-b*; 550*a-b*) so that the calibration object (520; 525) changes position from where the first real surface (521*a*; 527*a*) intersects the light plane (511) for the imaging in the first image (540*a*; 550*a*) to another position where the second real surface (521*b*; 527*b*) intersects the light plane (511) for the imaging in the second image (540*b*; 550*b*).

6. The method as claimed in claim 5, wherein the first and second real surfaces (526*a-b*) are separate surfaces of the single calibration object (525).

7. The method as claimed in claim 6, wherein the position change comprises movement of the calibration object (525) along a support surface that the calibration object (525) rests on when imaged.

8. The method as claimed in claim 5, wherein the first and second real surfaces (526*a-b*) are one and the same real surface of the single calibration object (520), wherein the position change comprises that said same real surface is tilted between said first and second images (540*a-b*) so that said same real surface has a different orientation in the light plane (511) when the second real line (512*b*) is formed than orientation of said same real surface in the light plane (511) when the first real line (512*a*) is formed.

9. A computer program (903) comprising instructions that when executed by one or more processors (904) causes one or more devices (405; 430; 434; 900) to perform the method according to claim 1.

10. A carrier comprising a non-transitory computer program (903) according to claim 9, wherein the carrier is one of an electronic signal, optical signal, radio signal or computer readable storage medium (1001).

11. A device (405; 430; 434; 900) for provision of a pair of real world and image sensor correspondence points for use in calibration of an imaging system (405) for three dimensional imaging based on light triangulation, said imaging system comprising a camera (430; 530) with image sensor (431) and a light source (410; 510) for providing a light plane (411; 511), said light triangulation involving imaging by said camera of reflected light resulting from said light plane (411; 511) intersecting with and thereby causing reflections from a surface, said correspondence points being a real world point (514-1; 529-1), located in said light plane (411; 511), and an image sensor point (544-1; 554-1) that corresponds to where said real world point (514-1; 529-1) is imaged on the image sensor (431) by the imaging system (405), wherein said device is configured to:
provide said real world point (514-1; 529-1) as a first virtual intersection between a first real world line (512*a*; 527*a*) and a second real world line (512*b*; 527*b*), wherein said first real world line (512*a*; 527*a*) corresponds to a first real intersection between a first real surface (521*a*; 526*a*) and the light plane (511) and wherein reflected light from said first real intersection is captured by the imaging system (405) in a first image (540*a*; 550*a*), and
wherein said second real world line (512*b*; 527*b*) corresponds to a second real intersection between a second real surface (521*b*; 527*b*) and the light plane (411; 511) and wherein reflected light from said second real intersection is captured by the imaging system (405) in another, second, image (540*b*; 550*b*); and provide said image sensor point (544-1; 554-1) as a second virtual intersection between a first image line (542*a*; 552*a*) corresponding to positions of intensity peaks of said captured light in the first image (540*a*; 550*a*) and a second image line (542*b*; 552*b*) corresponding to positions of intensity peaks of said captured light in the second image (540*b*; 550*b*).

* * * * *